(12) United States Patent
Liu

(10) Patent No.: US 11,592,867 B2
(45) Date of Patent: Feb. 28, 2023

(54) SLIDING MECHANISM AND ELECTRONIC DEVICE

(71) Applicant: BEIJING XIAOMI MOBILE SOFTWARE CO., LTD., Beijing (CN)

(72) Inventor: Zhenhua Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/329,712

(22) Filed: May 25, 2021

(65) Prior Publication Data

US 2022/0129035 A1    Apr. 28, 2022

(30) Foreign Application Priority Data

Oct. 27, 2020 (CN) .......................... 202011165852.8

(51) Int. Cl.
*G06F 1/16*    (2006.01)

(52) U.S. Cl.
CPC .......... *G06F 1/1624* (2013.01); *G06F 1/1652* (2013.01); *G06F 1/1656* (2013.01); *G06F 1/1679* (2013.01)

(58) Field of Classification Search
CPC .... G06F 1/1624; G06F 1/1652; G06F 1/1656; G06F 1/1679; H04M 1/026; H04M 1/185; H04M 1/0237; H04M 1/0247
See application file for complete search history.

(56) References Cited

U.S. PATENT DOCUMENTS

| | | | |
|---|---|---|---|
| 9,519,313 B2 * | 12/2016 | Kim | G06F 1/166 |
| 10,571,969 B2 * | 2/2020 | Yeh | G06F 1/1601 |
| 10,747,269 B1 * | 8/2020 | Choi | G06F 1/1643 |
| 10,975,603 B2 * | 4/2021 | Tazbaz | E05D 7/00 |
| 2016/0170450 A1 * | 6/2016 | Kim | G06F 1/166 361/807 |
| 2018/0014417 A1 | 1/2018 | Seo et al. | |
| 2018/0081473 A1 | 3/2018 | Seo et al. | |
| 2018/0103550 A1 * | 4/2018 | Seo | G06F 1/1601 |
| 2018/0103552 A1 * | 4/2018 | Seo | G06F 1/1652 |
| 2020/0135064 A1 * | 4/2020 | Lee | G06F 1/1652 |
| 2020/0201394 A1 * | 6/2020 | Choi | G06F 1/1652 |
| 2020/0267246 A1 * | 8/2020 | Song | H05K 1/148 |
| 2021/0044683 A1 * | 2/2021 | He | G06F 1/1624 |

(Continued)

OTHER PUBLICATIONS

European Patent Application No. 21176789.2 extended Search and Opinion dated Dec. 8, 2021, 10 pages.

*Primary Examiner* — Rockshana D Chowdhury
(74) *Attorney, Agent, or Firm* — Lathrop GPM LLP

(57) ABSTRACT

The present disclosure provides a sliding mechanism and an electronic device. The sliding mechanism is used in the electronic device, and includes a sliding rail assembly and a driving assembly. The sliding rail assembly includes at least one fixing member and at least one sliding rail, the fixing member is fixed to a housing assembly of the electronic device and provided with a first sliding groove, and the sliding rail has an end slidably limited in the first sliding groove. The driving assembly is fixed to the housing assembly, coupled to the sliding rail, and configured to drive the at least one sliding rail to slide outwards from a retracted state to an extended state from the housing assembly and to slide inwards towards the retracted state of the housing assembly from the extended state.

18 Claims, 22 Drawing Sheets

(56) References Cited

U.S. PATENT DOCUMENTS

2021/0081002 A1* 3/2021 Chueh .................. G06F 1/1616
2021/0385315 A1* 12/2021 Cha ....................... G06F 1/1624
2022/0066510 A1* 3/2022 Cha ....................... G06F 1/1677

* cited by examiner

SLIDING MECHANISM AND ELECTRONIC DEVICE

CROSS-REFERENCE TO RELATED APPLICATION

The present application is based on and claims priority to Chinese Patent Application Serial No. 202011165852.8, filed on Oct. 27, 2020, the entire content of which is incorporated herein by reference.

FIELD

The present disclosure relates to a field of electronic devices, and particularly to a sliding mechanism and an electronic device.

BACKGROUND

With the development of a flexible screen technology, screens of an electronic device have more and more abundant forms, such as foldable screens, surround screens, curved screens, or the like. As the volume of electronic devices decreases and the capacity of batteries increases, flexible screens also have been developed with flexible design forms. Extension and retraction of the flexible screens may not only satisfy use demands of users for screen sizes, but also facilitate miniaturization of the electronic device to improve user experiences. However, controlling the flexible screens to extend and retract may be challenging to design.

SUMMARY

An aspect of the present disclosure provides a sliding mechanism for an electronic device, including: a sliding rail assembly including at least one fixing member and at least one sliding rail, the fixing member being fixed to a housing assembly of the electronic device and provided with a first sliding groove, and the sliding rail having an end slidably limited in the first sliding groove; and a driving assembly fixed to the housing assembly, coupled to the sliding rail, and configured to drive the at least one sliding rail to slide outwards from a retracted state to an extended state from the housing assembly and to slide inwards towards the retracted state of the housing assembly from the extended state.

Another aspect of the present disclosure provides an electronic device, including: a housing assembly; a sliding mechanism assembled to the housing assembly, the sliding rail of the sliding mechanism including a front surface and a rear surface opposite to the front surface; and a flexible screen. The sliding mechanism includes: a sliding rail assembly including at least one fixing member and at least one sliding rail, the fixing member being fixed to the housing assembly and provided with a first sliding groove, and the sliding rail having an end slidably limited in the first sliding groove; and a driving assembly fixed to the housing assembly, coupled to the sliding rail, and configured to drive the at least one sliding rail to slide outwards from a retracted state to an extended state from the housing assembly and to slide inwards towards the retracted state of the housing assembly from the extended state. A first part of the flexible screen being provided at the front surface of the sliding rail and fixed to the housing assembly, at least an end portion of the flexible screen being provided at an edge or the rear surface of the sliding rail, and the sliding rail being slidable outwards from a retracted state to an extended state from the housing assembly to extend the flexible screen and slidable towards the housing assembly to retract the flexible screen.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with some aspects related to the disclosure as recited in the appended claims.

The terminology used herein is for the purpose of describing particular embodiments only and is not intended to be limiting of the disclosure. Unless defined otherwise, the technical or scientific terms used in the disclosure should have the same meanings as commonly understood by one of ordinary skilled in the art to which the present disclosure belongs. The terms "first", "second" and the like in the description and the claims of the present disclosure do not mean any sequential order, number or importance, but are only used for distinguishing different components. Similarly, the terms "a", "an" and the like do not denote a limitation of quantity, but denote the existence of at least one. Unless otherwise stated, the terms "includes", "including", "includes", "including" and the like mean that the element or object in front of the "includes", "including", "includes" and "including" encompasses the elements or objects and their equivalents illustrated following the "includes", "including", "includes" and "including", but do not exclude other elements or objects. The term "coupled", "connected" or the like is not limited to being connected physically or mechanically, but may include electric connection, direct or indirect.

As used in the description of the present disclosure and the appended claims, "a" and "the" in singular forms mean including plural forms, unless clearly indicated in the context otherwise. It should also be understood that, as used herein, the term "and/or" represents and contains any one or all possible combinations of one or more associated listed items.

With the development of flexible screens, the flexible screens have diversified design forms. Exemplarily, the flexible screen may include an extended state and a retracted state, which gives an electronic device different sizes of display areas to enhance user experiences. Extension and retraction of the flexible screen may be achieved by a sliding mechanism according to embodiments of the present disclosure, and the following description is provided in conjunction with the accompanying drawings.

Figure 1:
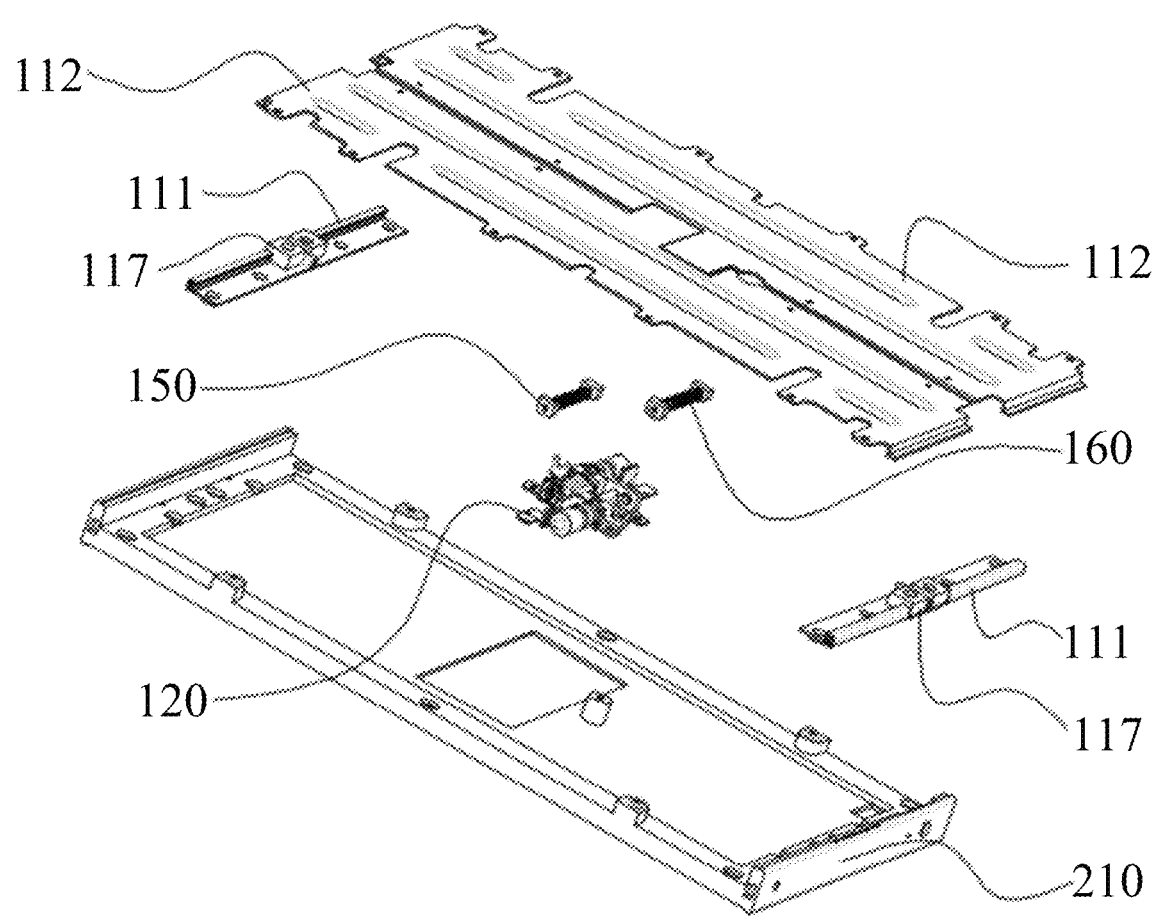
FIG. 1 shows a partial schematic exploded diagram of an electronic device according to an exemplary embodiment of the present disclosure.

FIG. 1 shows a partial schematic exploded diagram of an electronic device according to an exemplary embodiment of the present disclosure. A sliding mechanism 100 according to embodiments of the present disclosure is used in the electronic device, and referring to FIG. 1, the sliding mechanism 100 includes a sliding rail assembly 110 and a driving assembly 120.

Figure 2:
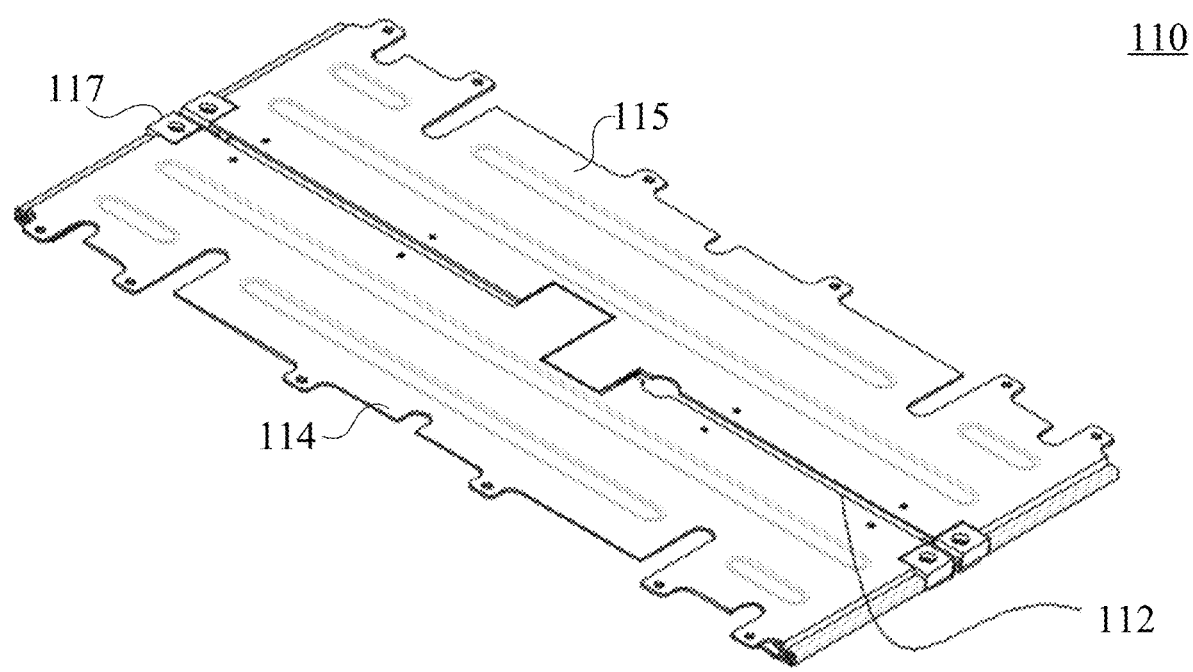
FIG. 2 shows a schematic diagram of retraction of a sliding rail according to an exemplary embodiment of the present disclosure.
Figure 3:
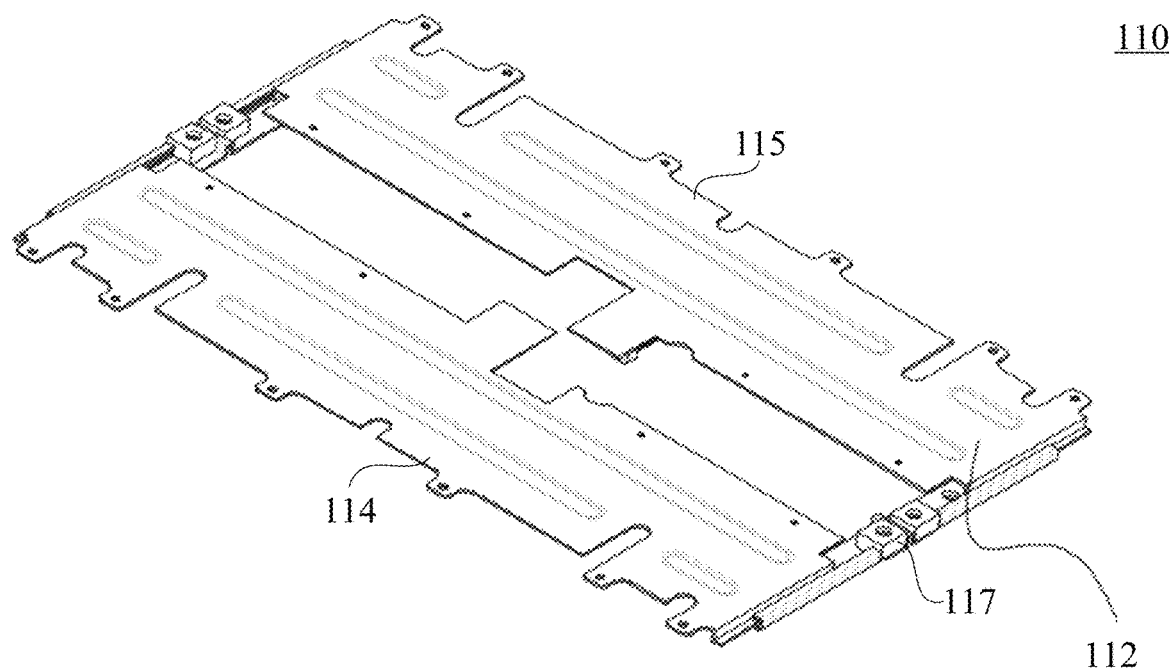
FIG. 3 shows a schematic diagram of extension of a sliding rail according to an exemplary embodiment of the present disclosure.
Figure 4:
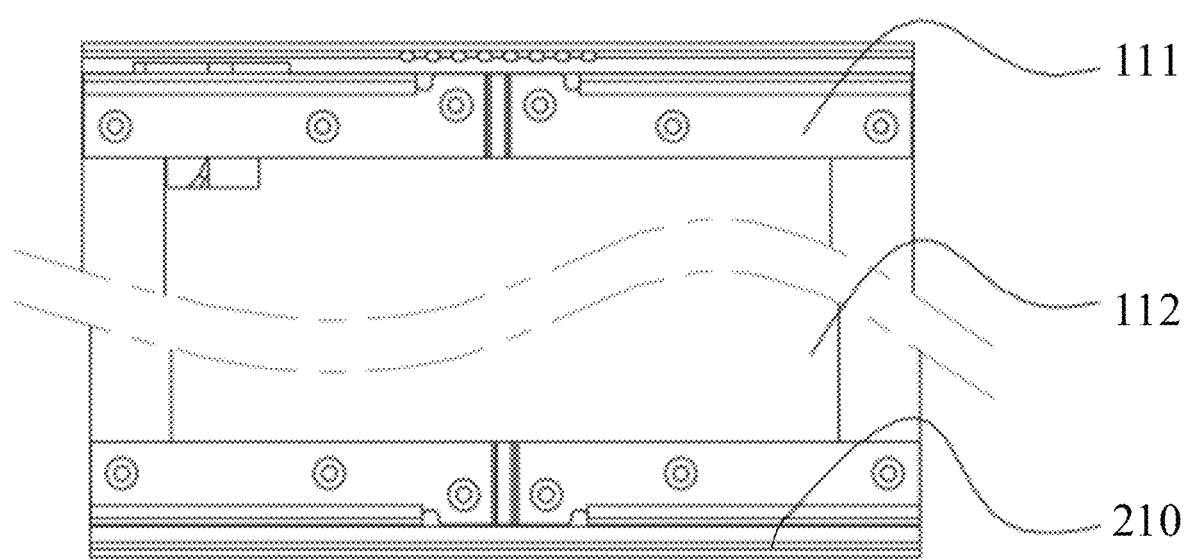
FIG. 4 shows a schematic diagram of fitting between a sliding rail assembly and a housing assembly according to an exemplary embodiment of the present disclosure.
Figure 5:
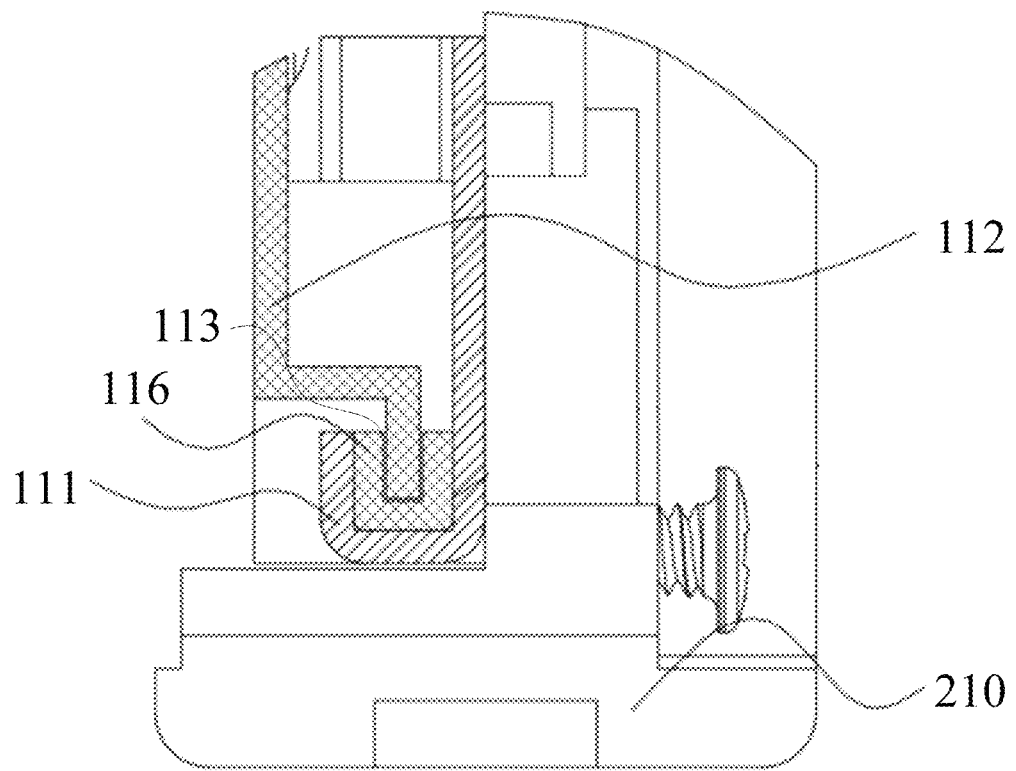
FIG. 5 shows a schematic diagram of fitting between a sliding rail assembly and a housing assembly according to an exemplary embodiment of the present disclosure.
Figure 6:
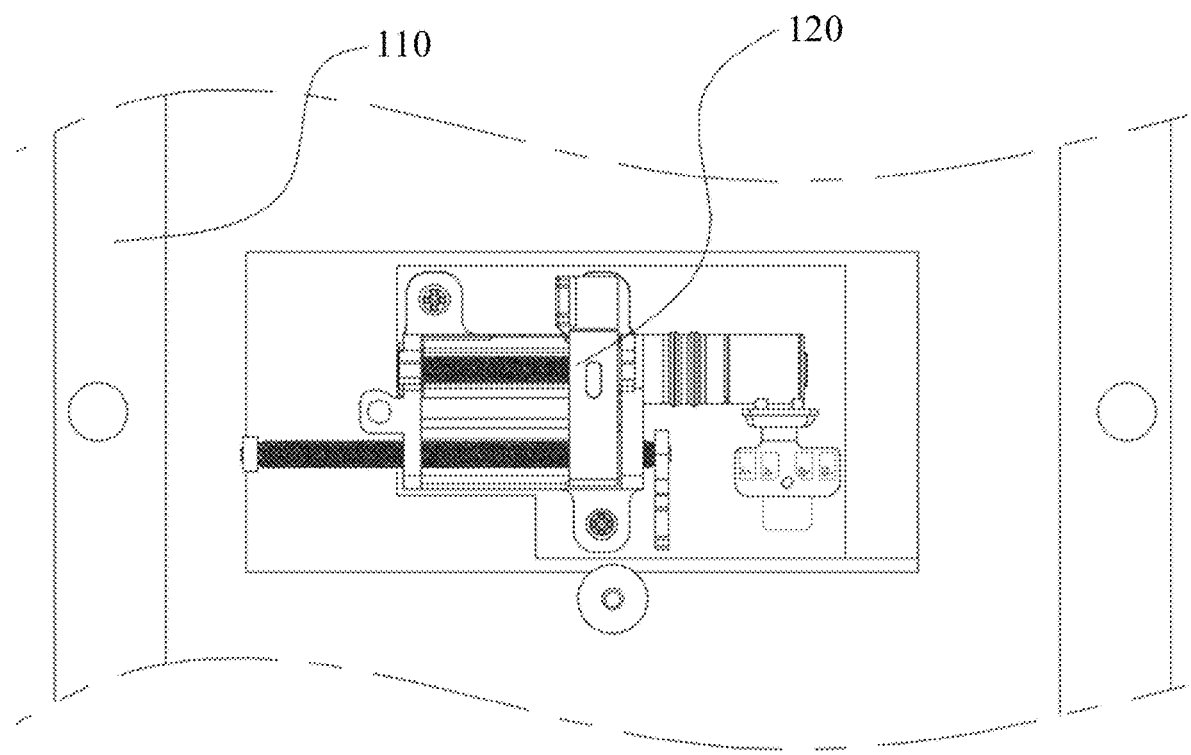
FIG. 6 shows a schematic diagram of fitting between a sliding rail assembly and a driving assembly according to an exemplary embodiment of the present disclosure.
Figure 7:
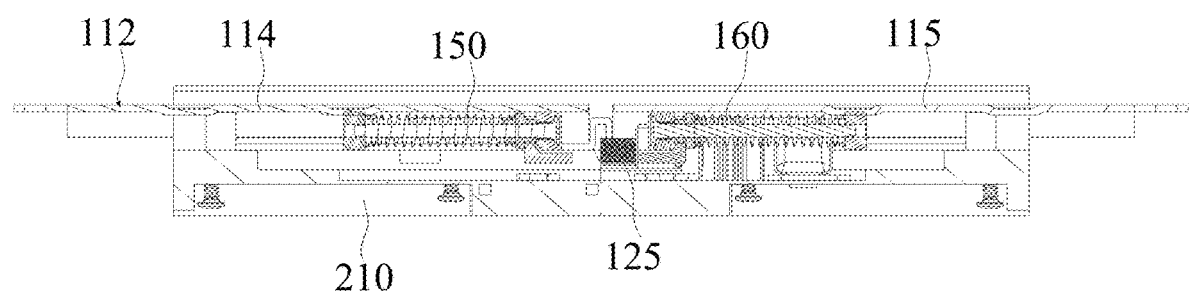
FIG. 7 shows a partial sectional view of fitting of a sliding rail assembly, a driving assembly and a housing assembly according to an exemplary embodiment of the present disclosure.
Figure 8:
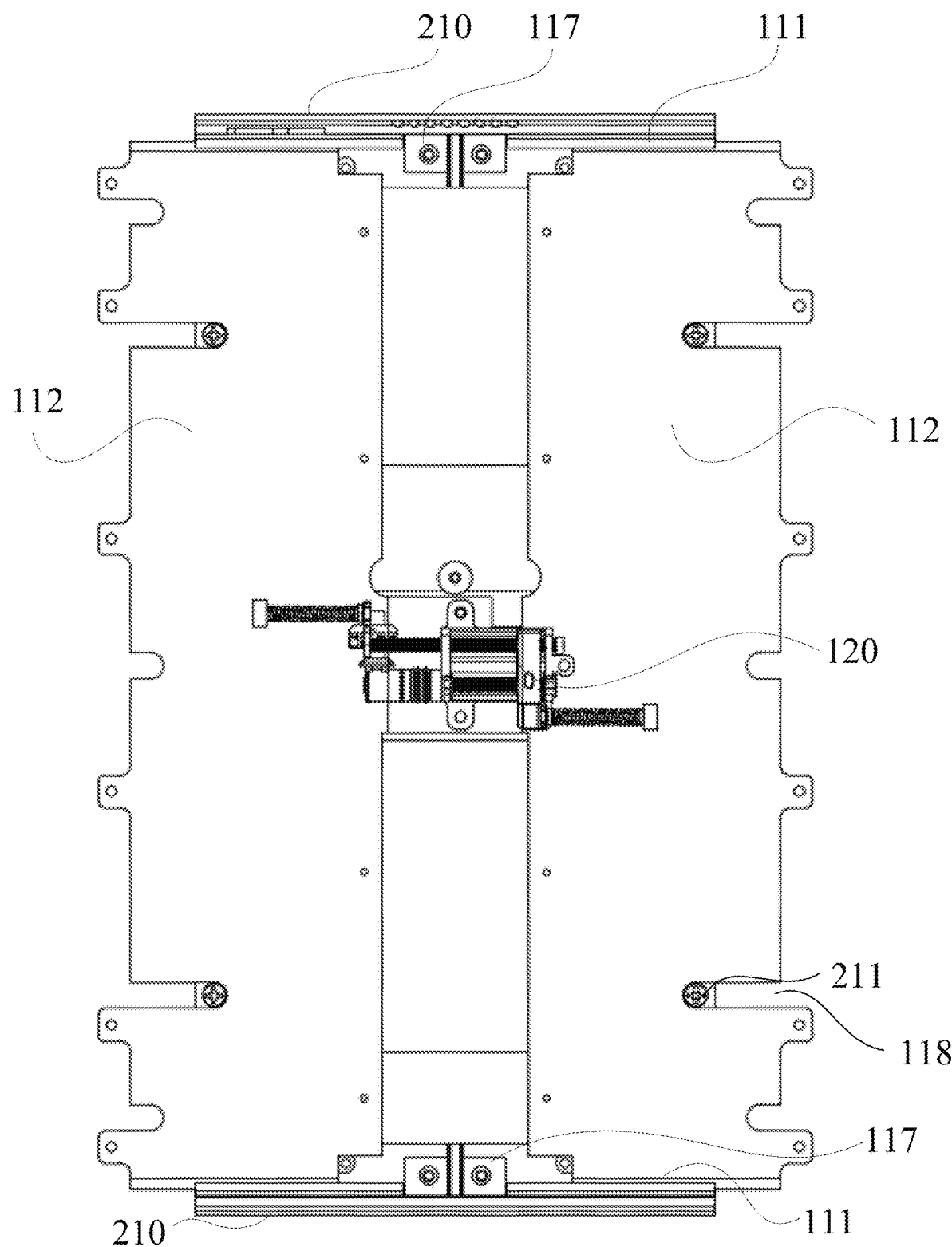
FIG. 8 shows a schematic diagram of fitting of a sliding rail assembly, a driving assembly and a housing assembly according to an exemplary embodiment of the present disclosure.

FIG. 2 shows a schematic diagram of retraction of a sliding rail 112 according to an exemplary embodiment of the present disclosure, FIG. 3 shows a schematic diagram of extension of a sliding rail 112 according to an exemplary embodiment of the present disclosure, FIG. 4 shows a schematic diagram of fitting between a sliding rail assembly 110 and a housing assembly 210 according to an exemplary embodiment of the present disclosure, and FIG. 5 shows a schematic diagram of fitting between a sliding rail assembly 110 and a housing assembly 210 according to an exemplary embodiment of the present disclosure. Referring to FIGS. 2 to 5, the sliding rail assembly 110 includes at least one fixing member 111 and at least one sliding rail 112. The fixing member 111 is fixed to a housing assembly 210 of the electronic device and provided with a first sliding groove 113, and the sliding rail 112 has an end slidably limited in the first sliding groove 113. FIG. 6 shows a schematic diagram of fitting between a sliding rail assembly 110 and a driving assembly 120 according to an exemplary embodiment of the present disclosure, FIG. 7 shows a partial sectional view of fitting of a sliding rail assembly 110, a driving assembly 120 and a housing assembly 210 according to an exemplary embodiment of the present disclosure, and FIG. 8 shows a schematic diagram of fitting of a sliding rail assembly 110, a driving assembly 120 and a housing assembly 210 according to an exemplary embodiment of the present disclosure. Referring to FIGS. 6 to 8, the driving assembly 120 is fixed to the housing assembly 210, coupled to the sliding rails 112, and configured to drive at least one sliding rail 112 to slide outwards from a retracted state to an extended state from the housing assembly 210 and to slide inwards towards the retracted state of the housing assembly 210 from the extended state.

In the sliding mechanism 100 according to embodiments of the present disclosure, an end of the sliding rail 112 is slidably limited in the first sliding groove 113, the driving assembly 120 is fixed to the housing assembly 210 and coupled to the sliding rail 112, and a flexible screen of the electronic device may be extended by driving the sliding rail 112 to slide outwards from the retracted state to the extended state from the housing assembly 210 through the driving assembly 112, so as to increase a display area of the flexible screen. The flexible screen of the electronic device may be retracted by driving the sliding rail 112 to slide inward towards the retracted state of the housing assembly 210 from the extended state through the driving assembly 120, so as to reduce the display area of the flexible screen. The sliding rail 112 may be driven to slide to any position in a maximum stroke of the sliding rail 112 through the driving assembly 120, such that the flexible screen may act as a display in different sizes, thus improving user experience.

In some embodiments, with continued reference to FIGS. 2 and 3, the sliding rail 112 includes a first sliding rail 114 and a second sliding rail 115, and the driving assembly 120 is coupled to the first and second sliding rails 114, 115, and configured to drive the first and second sliding rails 114, 115 to slide towards and away from each other. When slid away from each other, or when slid outwards from the housing assembly 210 oppositely, the first and second sliding rails 114, 115 are in an extended state, and thus, the flexible screen may be in an extended state. When slid towards each other, or when slid towards the housing assembly 210 from the outside oppositely, the first and second sliding rails 114, 115 are in a retracted state, and thus, the flexible screen may be in a retracted state. Two fixing members 111 may be provided and arranged oppositely, and the first and second sliding rails 114, 115 are limited between the two first sliding grooves 113 of the two fixing members 111. Exemplarily, the fixing member 111 may be fixed to the housing assembly 210 by a screw.

In some embodiments, referring to FIGS. 1, 2, and 3, the sliding rail assembly 110 further includes a buffer limiting member 117 provided at the fixing member 111 and configured to abut against the sliding rail 112 sliding from the outside to the housing assembly 210, thus limiting the maximum stroke of the sliding rail 112 sliding towards the housing assembly 210. The buffer limiting member 117 may include a plastic member which not only limits the sliding rail 112, but also enables the sliding rail 112 and the buffer limiting member 117 to stably abut against each other without wearing the sliding rail 112.

In some embodiments, with continued reference to FIG. 5, the first sliding groove 113 includes a first lubrication layer 116 forming an inner wall of the first sliding groove 113. Thus, the sliding rail 112 may be facilitated to slide smoothly in the first sliding groove 113 of the fixing member 111. Exemplarily, the fixing member 111 may be formed by stamping stainless steel, a material of the first lubrication layer 116 includes polyoxymethylene (also called POM), and a lubrication effect is given to the inner wall of the first sliding groove 113 by injecting the polyoxymethylene into the groove to form the first lubrication layer 116.

Figure 9:
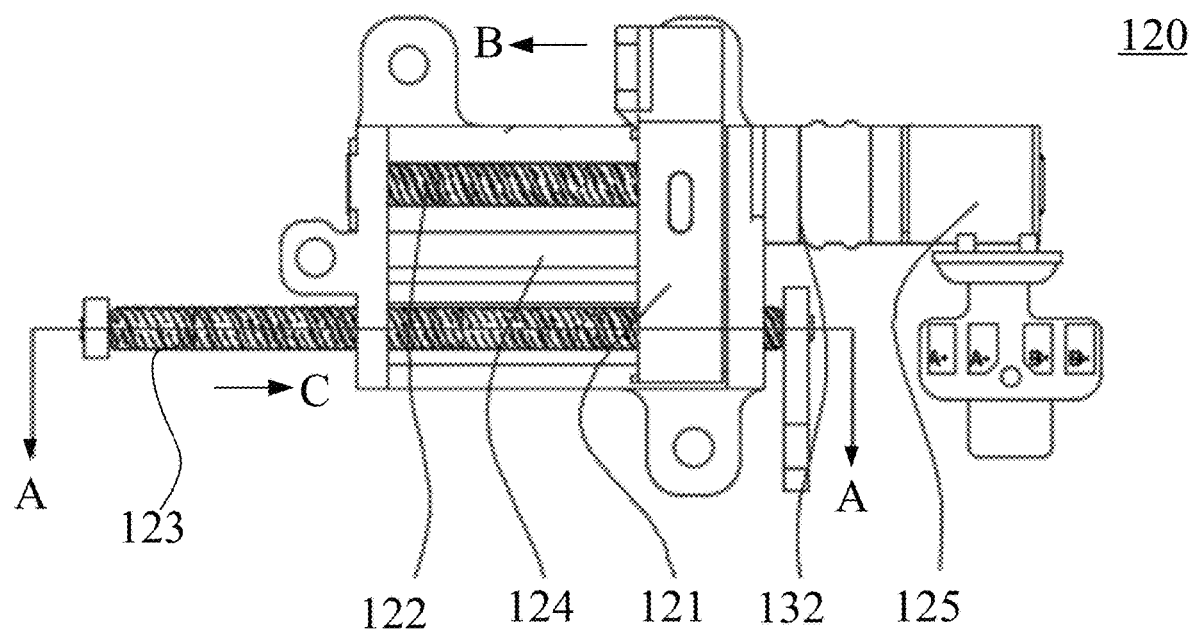
FIG. 9 shows a partial schematic structural diagram of a driving assembly according to an exemplary embodiment of the present disclosure.
Figure 10:
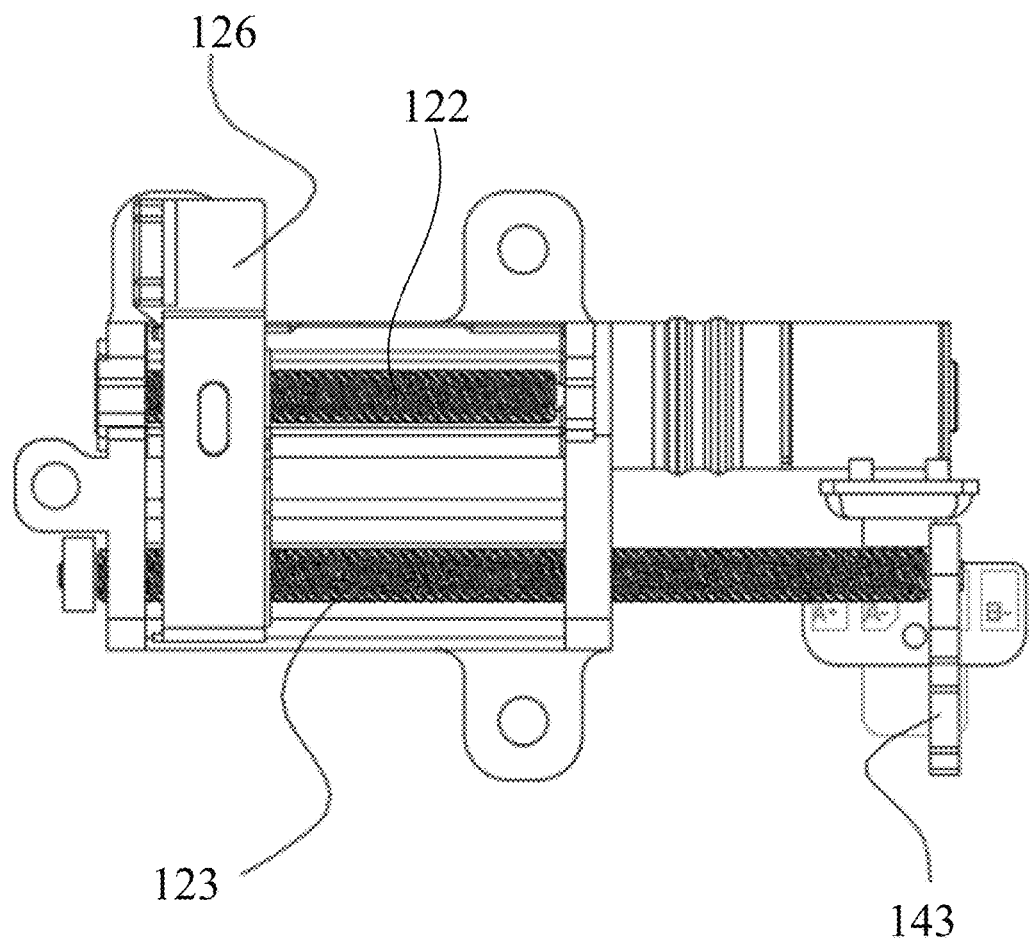
FIG. 10 shows a partial schematic structural diagram of a driving assembly according to an exemplary embodiment of the present disclosure.
Figure 11:
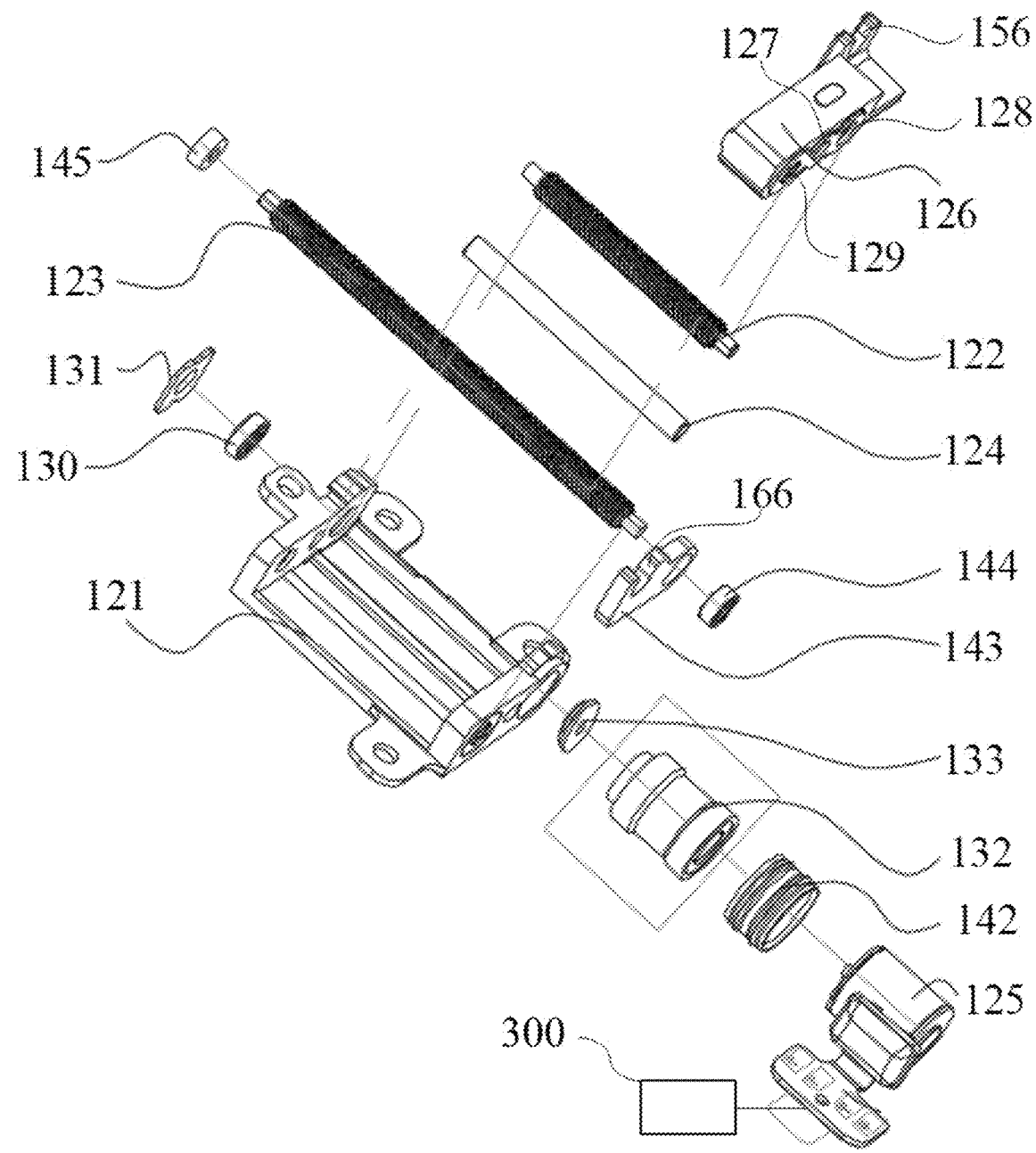
FIG. 11 shows a schematic exploded diagram of a driving assembly according to an exemplary embodiment of the present disclosure.

FIG. 9 shows a partial schematic structural diagram of a driving assembly 120 according to an exemplary embodiment of the present disclosure, FIG. 10 shows a partial schematic structural diagram of a driving assembly 120 according to an exemplary embodiment of the present disclosure, and FIG. 11 shows a schematic exploded diagram of a driving assembly 120 according to an exemplary embodiment of the present disclosure. In some embodiments, with reference to FIGS. 9 to 11, the driving assembly 120 includes a driving assembly support 121 fixed to the housing assembly 210, a first transmission lead screw 122, a second transmission lead screw 123, a first guide rod 124, a driving member 125 and a pushing member 126. The first transmission lead screw 122 and the first guide rod 124 are assembled to the driving assembly support 121, the second transmission lead screw 123 may be axially movably assembled to the driving assembly support 121, and the driving member 125 is configured to drive the first transmission lead screw 122 to rotate. The pushing member 126 is provided with a sliding hole 127, a first transmission hole 128 and a second transmission hole 129. The sliding hole 127 is slidably fitted over the first guide rod 124, the first transmission hole 128 is drivingly coupled to the first transmission lead screw 122, and the second transmission hole 129 is drivingly coupled to the second transmission lead screw 123. The second transmission lead screw 123 and the pushing member 126 have opposite moving directions, the pushing member 126 is configured to drive the first sliding rail 114 to slide, and the second transmission lead screw 123 is configured to drive the second sliding rail 115 to slide. When the driving member 125 drives the first transmission lead screw 122 to rotate, the rotating first transmission lead screw 122 drives the pushing member 126 to move linearly along an axial direction of the first transmission lead screw 122. The first guide rod 124 provides guidance for the pushing member 126 to ensure that the pushing member 126 is moved stably, and the pushing member 126 drives the first sliding rail 114 to slide. Meanwhile, the pushing member 126 drives the second transmission lead screw 123 to move in a direction opposite to the moving direction of the pushing member 126, and the second transmission lead screw 123 drives the second sliding rail 115 to move. It may be understood that, referring to FIG. 8, when the pushing member 126 is moved in direction B, the second transmission lead screw 123 is moved in direction C, such that the pushing member 126 and the second transmission lead screw 123 are in the state shown in FIG. 9. Due to the opposite moving directions of the pushing member 126 and the second transmission lead screw 123, the first and second sliding rails 114, 115 are slidably extended away from each other, or slidably retracted towards each other. An inner wall of the first transmission hole 128 is provided with a transmission thread fitted with the first transmission lead screw 122 to enable the pushing member 126 to be linearly moved under the driving action of the first transmission lead screw 122. An inner wall of the second transmission hole 129 is provided with a transmission thread fitted with the second transmission lead screw 123, such that when the pushing member 126 is moved linearly, the second transmission lead screw 123 is linearly moved opposite to the pushing member 126. Exemplarily, the first and second transmission holes 128, 129 may have opposite thread directions, such that the pushing member 126 and the second transmission lead screw 123 may have opposite moving directions. Exemplarily, the first and second transmission lead screws 122, 123 as well as the first guide rod 124 have parallel axial directions.

Exemplarily, the driving member 125 includes a stepping motor. The stepping motor is configured as an open-loop control stepping motor which converts an electrical pulse signal into angular displacement or linear displacement. Under a non-overload condition, a rotating speed and a stopping position of the stepping motor only depend on a frequency and a pulse number of the pulse signal and are not influenced by a load change. When a control chip of the stepping motor receives one pulse signal, the stepping motor is driven to be rotated by a fixed angle in a set direction, and a driving shaft of the stepping motor is rotated step by step by the fixed angle. The angular displacement may be controlled by controlling the number of the pulses, so as to achieve a purpose of accurate positioning. The rotating speed and acceleration of the stepping motor may be controlled by controlling the pulse frequency, so as to achieve purposes of speed regulation and rotating torque output.

Exemplarily, with continued reference to FIG. 11, an end of the first transmission lead screw 122 may be fitted in a first bearing 130, and the first bearing 130 is assembled to the driving assembly support 121 by a bearing pressing plate 131, such that the first transmission lead screw 122 may be rotated. The bearing pressing plate 131 is mainly configured to press the first bearing 130, and when not fixed by spot welding, the first bearing 130 may be pressed by the bearing pressing plate 131 which may be fixed on the driving assembly support 121 by spot welding. The bearing pressing plate 131 may be made of stainless steel.

In some embodiments, with continued reference to FIG. 11, the driving assembly 120 further includes a reduction gearbox 132 having a first end coupled to the first transmission lead screw 122, and a second end coupled to the driving member 125. The reduction gearbox 132 may amplify torque of the driving member 125 to drive the first transmission lead screw 122 to rotate, thereby causing the pushing member 126 to move linearly on the first transmission lead screw 122. The reduction gearbox 132 may be coupled to the first transmission lead screw 122 through a first lead screw bushing 133.

Figure 12:
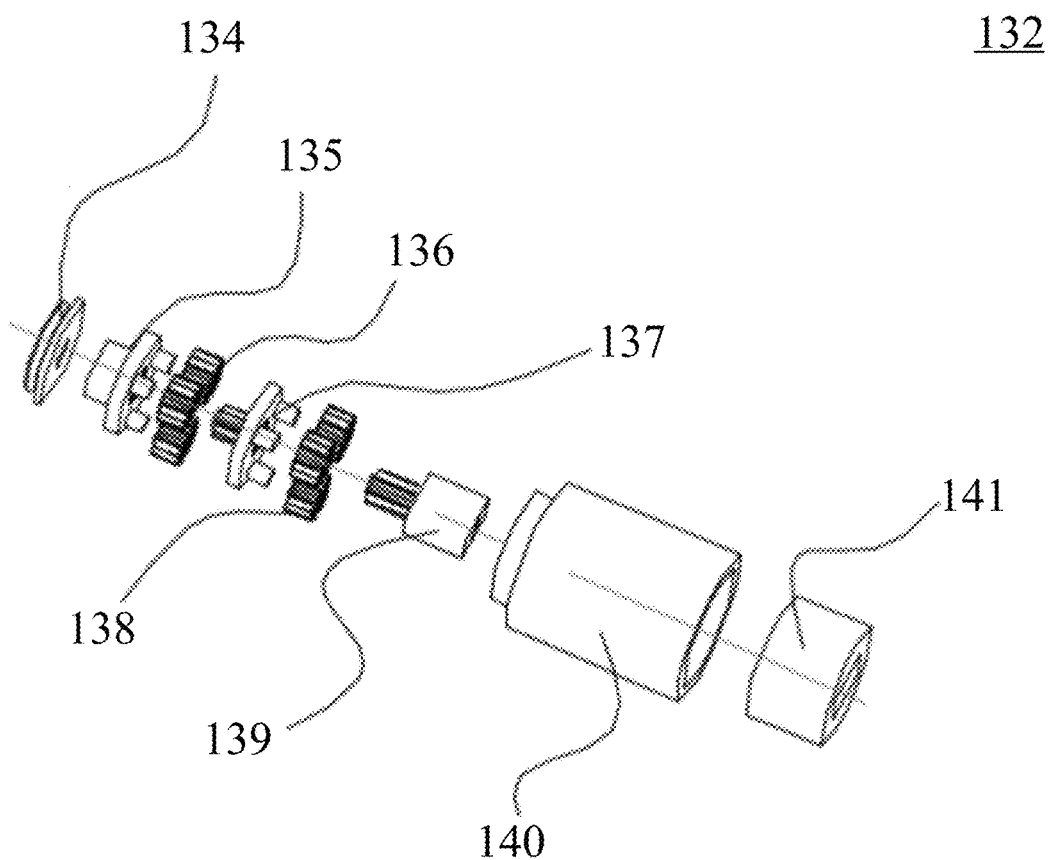
FIG. 12 shows a schematic exploded diagram of a reduction gearbox according to an exemplary embodiment of the present disclosure.

FIG. 12 shows a schematic exploded diagram of a reduction gearbox 132 according to an exemplary embodiment of the present disclosure. In some embodiments, referring to FIG. 12, the reduction gearbox 132 includes a lead screw bushing 134, a secondary gear carrier 135, a secondary planetary gear 136, a primary gear carrier 137, a primary planetary gear 138, a motor gear 139, a gear fixing ring 140 and a motor gear bushing 141. The secondary planetary gear 138 is assembled to the secondary gear carrier 135, and the primary planetary gear 138 is assembled to the primary gear carrier 137. The primary gear carrier 137, the secondary gear carrier 135 and the motor gear 139 are all assembled in the gear fixing ring 140, the motor gear 139 is fixedly coupled to an output shaft of the driving member 125, and the secondary gear carrier 135 is fixedly coupled to the first transmission lead screw 122. The torque of the driving member 125 is reduced by the two-stage planetary gears, and a torque which is several times or dozens of times larger than the torque of the driving member 125 is output to the first transmission lead screw 122 to drive the first transmission lead screw 122 to rotate.

In some embodiments, with continued reference to FIG. 11, the driving assembly 120 further includes a shock absorption member 142 fitted over an outer surface of the reduction gearbox 132 to absorb abnormal noises and shocks. Exemplarily, the shock absorption member 142 is molded by injecting a soft rubber material.

Figure 13:
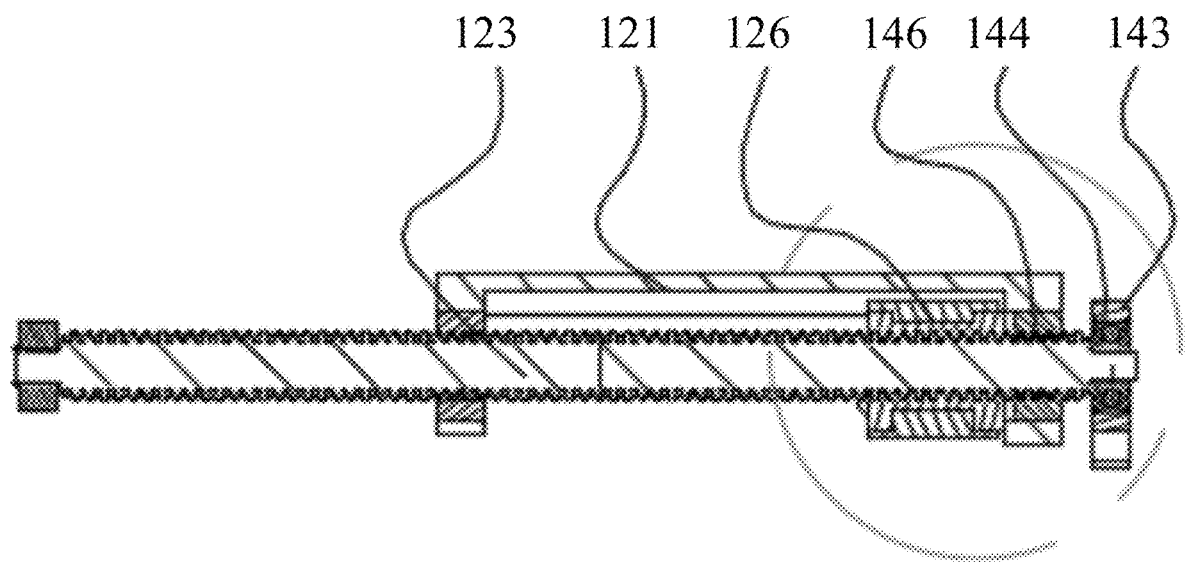
FIG. 13 shows a partial schematic structural diagram of a driving assembly according to an exemplary embodiment of the present disclosure.
Figure 14:
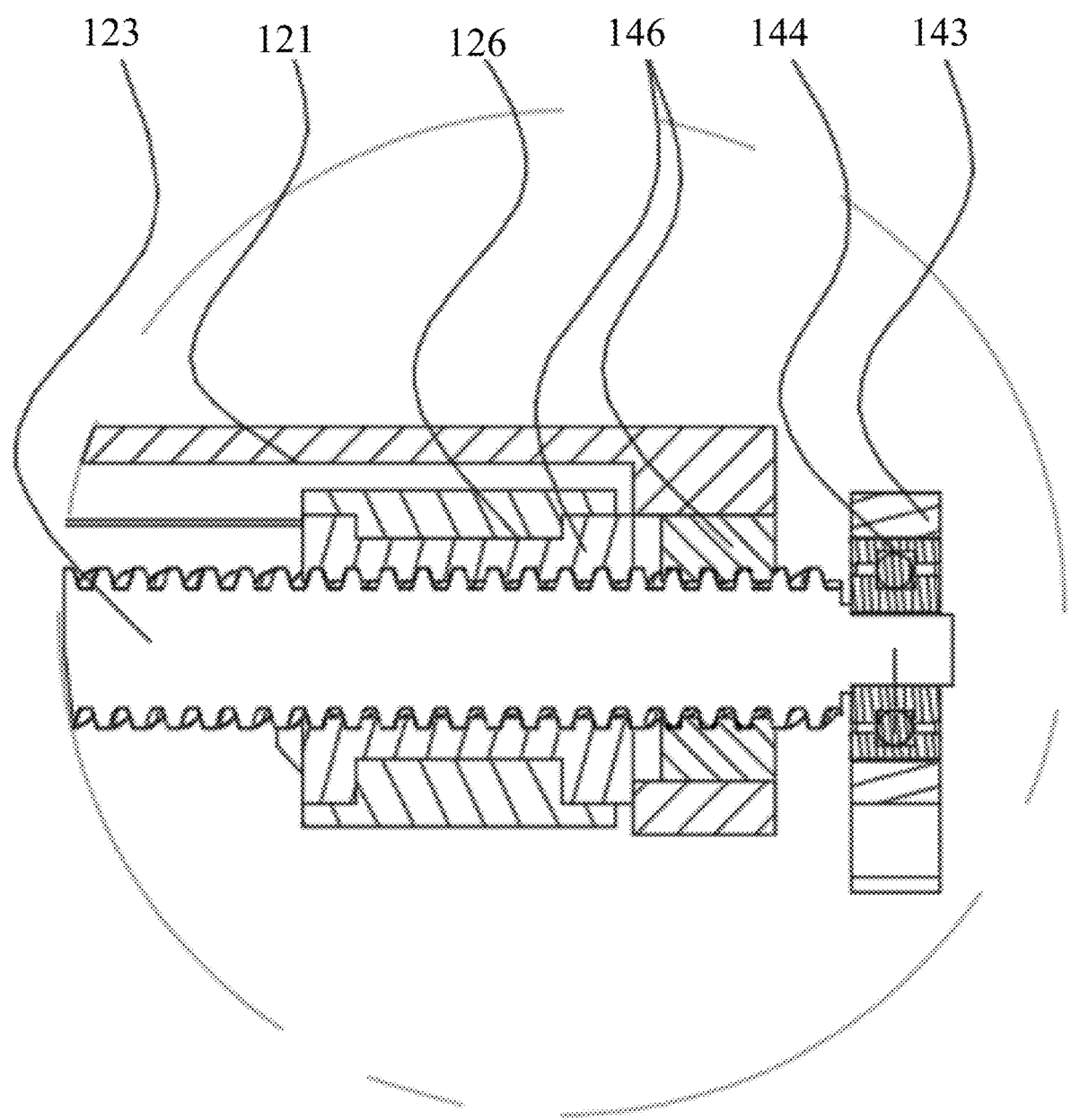
FIG. 14 shows a partial schematic enlarged diagram of the driving assembly in FIG. 13.

FIG. 13 shows a partial schematic structural diagram of a driving assembly 120 according to an exemplary embodiment of the present disclosure, and FIG. 14 shows a partial schematic enlarged diagram of the driving assembly 120 in FIG. 13. In some embodiments, referring to FIGS. 11, 13 and 14, the driving assembly 120 further includes an adapter 143, an end of the second transmission lead screw 123 is rotatably coupled to the adapter 143, and the adapter 143 is configured to drive the second sliding rail 115 to slide. Exemplarily, the adapter 143 is fixedly provided with a second bearing 144, a first end of the second transmission lead screw 123 is rotatably coupled to the second bearing 144, a second end of the second transmission lead screw 123 is provided with a limiting block 145, the driving assembly support 121 is provided with two opposite through holes, and after the second transmission lead screw 123 passes through the two through holes, the limiting block 145 and the adapter 143 cooperate to limit the second transmission lead screw 123. Exemplarily, the second bearing 144 is welded to an end of the second transmission lead screw 123 and the adapter 143, such that the second transmission lead screw 123 may be rotated relative to the adapter 143. Exemplarily, the inner wall of the second transmission hole 129 of the pushing member 126 is formed by a second lubrication layer 146, and the second lubrication layer 146 may be made of polyoxymethylene (also called POM) to achieve a lubrication function, thus facilitating transmission between the second transmission hole 129 and the second transmission lead screw 123. The pushing member 126 may employ powder metallurgy and plastic double-shot molding processes, and the inner wall of the first transmission hole 128 may also be made of polyoxymethylene (also called POM).

Figure 15:
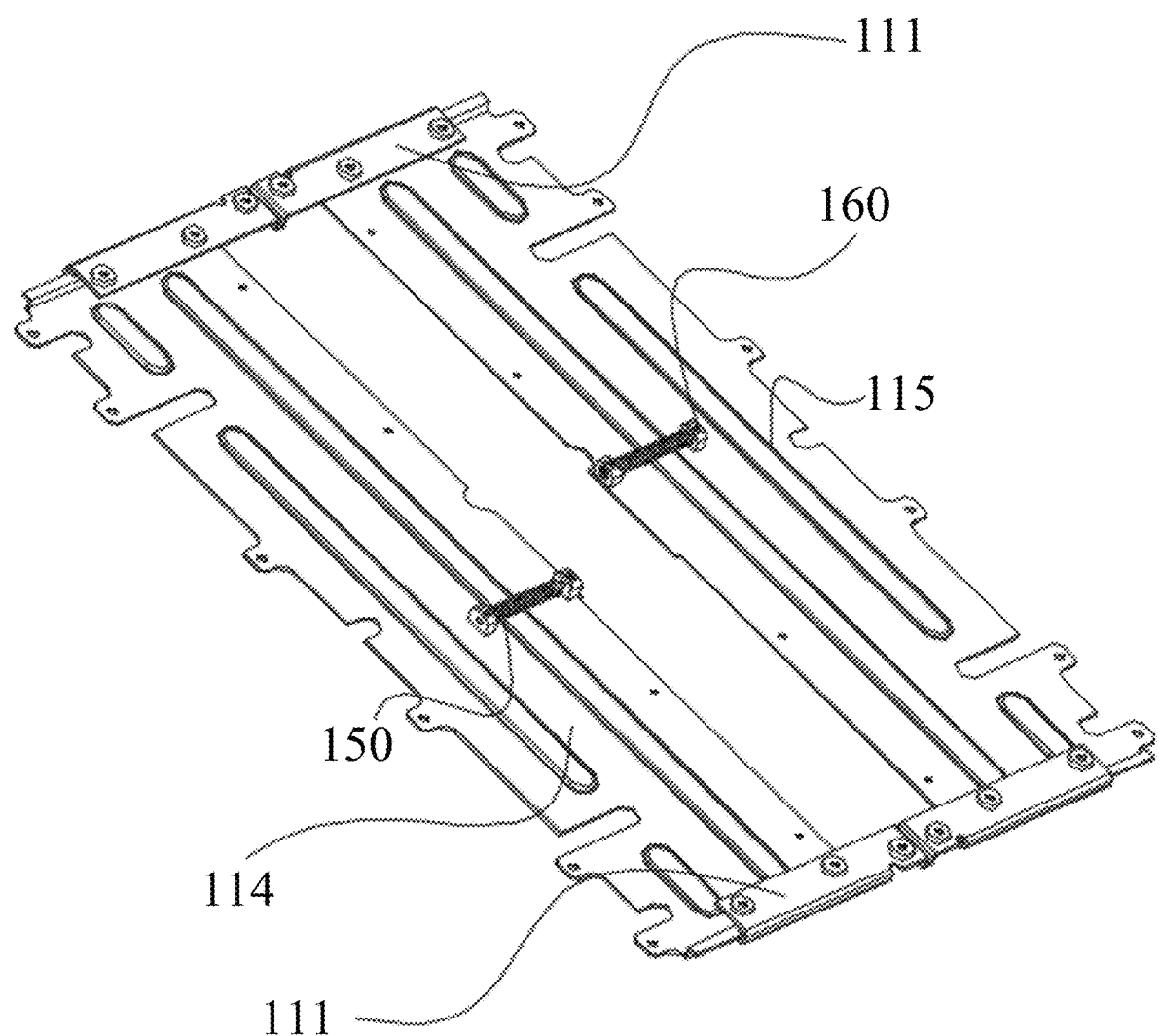
FIG. 15 shows a schematic view of fitting among a first elastic buffer assembly, a second elastic buffer assembly and a sliding rail according to an exemplary embodiment of the present disclosure.
Figure 16:
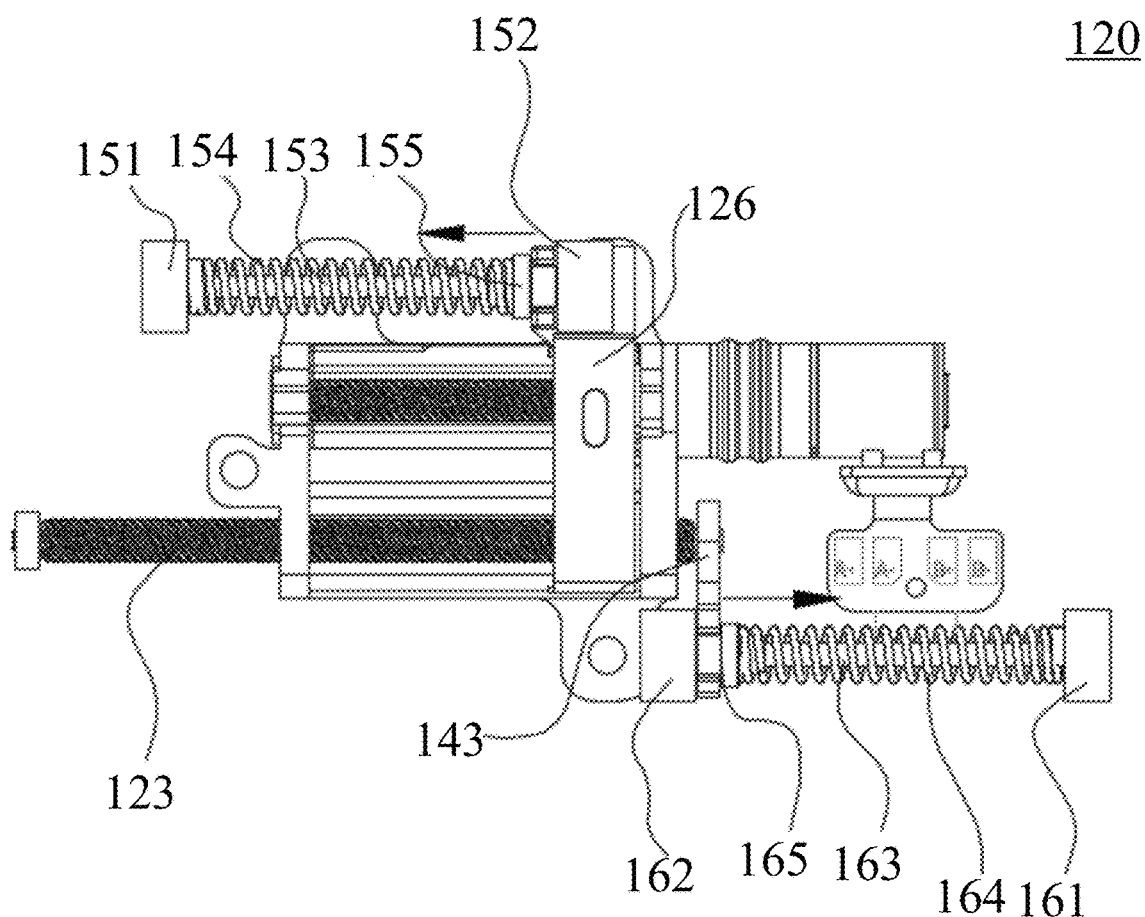
FIG. 16 shows a schematic structural diagram of a driving assembly according to an exemplary embodiment of the present disclosure.

FIG. 15 shows a schematic view of fitting among a first elastic buffer assembly 150, a second elastic buffer assembly 160 and a sliding rail 112 according to an exemplary embodiment of the present disclosure, and FIG. 16 shows a schematic structural diagram of a driving assembly 120 according to an exemplary embodiment of the present disclosure. In some embodiments, with reference to FIGS. 15 and 16, the driving assembly 120 further includes the first and second elastic buffer assemblies 150, 160. The first elastic buffer assembly 150 is fixed to the first sliding rail 114, the second elastic buffer assembly 160 is fixed to the second sliding rail 115, the first elastic buffer assembly 150 is coupled to the pushing member 126, and the second elastic buffer assembly 160 is coupled to the adapter 143. Thus, the pushing member 126 may stably drive the first sliding rail 114 to slide through the first elastic buffer assembly 150, and the adapter 143 may stably drive the second sliding rail 115 to slide through the second elastic buffer assembly 160.

In some embodiments, with continued reference to FIG. 16, the first elastic buffer assembly 150 includes a first fixed portion 151, a second fixed portion 152, a second guide rod 153, and a first elastic member 154. The first and second fixed portions 151, 152 are fixed to the first sliding rail 114, the second guide rod 153 is fixed between the first and second fixed portions 151, 152, the first elastic member 154 is fitted over the second guide rod 153, and the pushing member 126 pushes the first elastic member 154 to extend and retract on the second guide rod 153. Thus, the pushing member 126 pushes the first elastic member 154 to extend and retract on the second guide rod 153, such that the first elastic member 154 applies an acting force to the first or second fixed portion 151, 152, thereby stably pushing the first sliding rail 114 to slide. Exemplarily, a first end of the second guide rod 153 is fixed to the first fixed portion 151 by a thread, and a second end of the second guide rod 153 abuts against the second fixed portion 152, so as to facilitate assembly and disassembly of the first elastic buffer assembly 150 and the first sliding rail 114. In addition, the first end of the second guide rod 153 may be welded to the first fixed portion 151, and the second end may be welded to the second fixed portion 152.

In some embodiments, with continued reference to FIG. 16, the first elastic buffer assembly 150 further includes a first guide sleeve 155 slidably fitted over the second guide rod 153 and coupled to an end of the first elastic member 154, and the pushing member 126 is coupled to the first guide sleeve 155. The pushing member 126 pushes the first guide sleeve 155, such that the first guide sleeve 155 drives the first elastic member 154 to slidably extend and retract on the second guide rod 153, so as to stably push the first sliding rail 114 to slide. Exemplarily, the pushing member 126 is provided with a first slot 156 engaged with the first guide sleeve 155.

In some embodiments, with continued reference to FIG. 16, the second elastic buffer assembly 160 includes a third fixed portion 161, a fourth fixed portion 162, a third guide rod 163, and a second elastic member 164. The third and fourth fixed portions 161, 162 are fixed to the second sliding rail 115, the third guide rod 163 is fixed between the third and fourth fixed portions 161, 162, the second elastic member 164 is fitted over the third guide rod 163, and the adapter 143 pushes the second elastic member 164 to extend and retract on the third guide rod 163. Thus, the adapter 143 pushes the second elastic member 164 to extend and retract on the third guide rod 163, such that the second elastic member 164 applies an acting force to the third or fourth fixed portion 161, 162, thereby stably pushing the second sliding rail 115 to slide. Exemplarily, a first end of the third guide rod 163 is fixed to the third fixed portion 161 by a thread, and a second end of the third guide rod 163 abuts against the fourth fixed portion 162, so as to facilitate assembly and disassembly of the second elastic buffer assembly 160 and the second sliding rail 115. In addition, the first end of the third guide rod 163 may be welded to the third fixed portion 161, and the second end may be welded to the fourth fixed portion 162.

In some embodiments, with continued reference to FIG. 16, the second elastic buffer assembly 160 further includes a second guide sleeve 165 slidably fitted over the third guide rod 163 and coupled to an end of the second elastic member 164, and the adapter 143 is coupled to the second guide sleeve 165. The adapter 143 pushes the second guide sleeve 165, such that the second guide sleeve 165 drives the second elastic member 164 to slidably extend and retract on the third guide rod 163, so as to stably push the second sliding rail 115 to slide. Exemplarily, the adapter 143 is provided with a second slot 166 engaged with the second guide sleeve 165.

Figure 17:
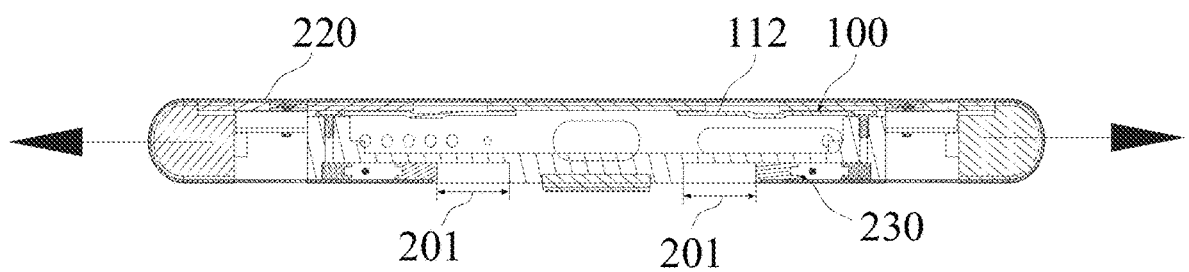
FIG. 17 shows a partial structural sectional view of an electronic device according to an exemplary embodiment of the present disclosure.

The electronic device according to the embodiments of the present disclosure includes, but is not limited to, a mobile phone, a tablet computer, an iPad, a digital broadcast terminal, a messaging apparatus, a game console, a medical apparatus, a fitness apparatus, a personal digital assistant, an intelligent wearable apparatus, an intelligent television, a floor sweeping robot, an intelligent sound box, a vehicle-mounted apparatus, or the like. FIG. 17 shows a partial structural sectional view of an electronic device according to an exemplary embodiment of the present disclosure. Referring to FIG. 17, the electronic device according to some embodiments of the present disclosure includes a housing assembly 210, any sliding mechanism 100 mentioned above, and a flexible screen 220.

The housing assembly 210 may include a middle frame configured to assemble and protect various components and parts of the electronic device. Exemplarily, the housing assembly 210 may be made of a metal material, such as an aluminum alloy, and formed with CNC (Computerized Numerical Control Machine) machining and nano-injection molding processes.

The sliding mechanism 100 is assembled to the housing assembly 210, and the sliding rail 112 of the sliding rail assembly 110 in the sliding mechanism 100 includes a front surface and a rear surface opposite to the front surface. It should be noted that the rear surface of the sliding rail 112 may face the middle frame.

Part of the flexible screen 220 is provided at the front surface of the sliding rail 112 and fixed to the housing assembly 210, at least an end portion of the flexible screen 220 is provided at an edge or the rear surface of the sliding rail 112, and the sliding rail 112 is slid outwards from the housing assembly 210 to extend the flexible screen 220, and slid towards the housing assembly 210 from the outside to retract the flexible screen 220.

In the electronic device according to the embodiments of the present disclosure, part of the flexible screen 220 is provided at the front surface of the sliding rail 112 and fixed to the housing assembly 210, at least an end portion of the flexible screen 220 is provided at the edge or the rear surface of the sliding rail 112, and the flexible screen 220 is extended when the sliding rail 112 is slid outwards from the housing assembly 210, so as to increase the display area of the flexible screen 220. The flexible screen 220 is retracted when the sliding rail 112 is slid towards the housing assembly 210 from the outside, so as to reduce the display area of the flexible screen 220. The sliding rail 112 may be driven to slide to any position in the maximum stroke of the sliding rail 112 by the driving assembly 120, such that the flexible screen 220 of the electronic device may perform display in different sizes, thus improving the user experiences. Compared with a foldable screen, a weight may be reduced, and the electronic device is convenient for a user to carry, and improves market competitiveness.

Figure 18:
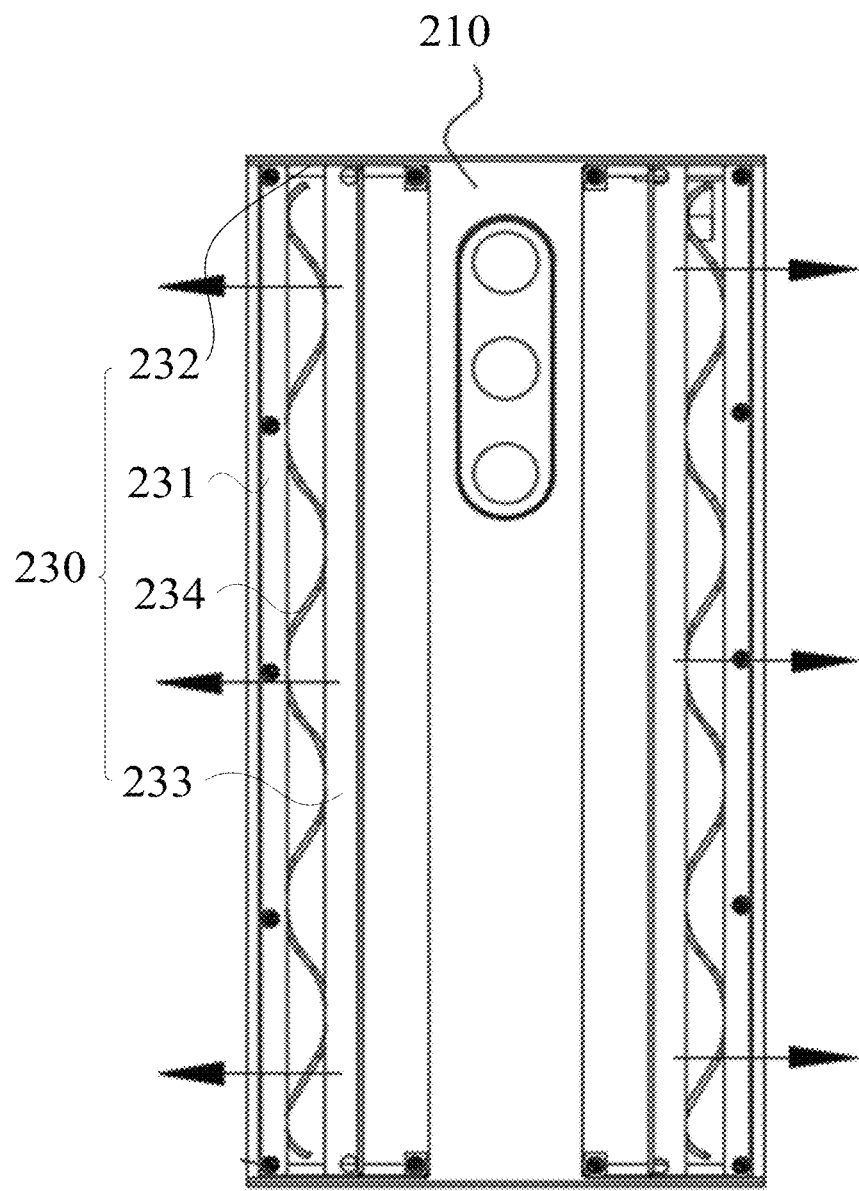
FIG. 18 shows a partial schematic structural diagram in which a flexible screen of an electronic device is in an extended state according to an exemplary embodiment of the present disclosure.
Figure 19:
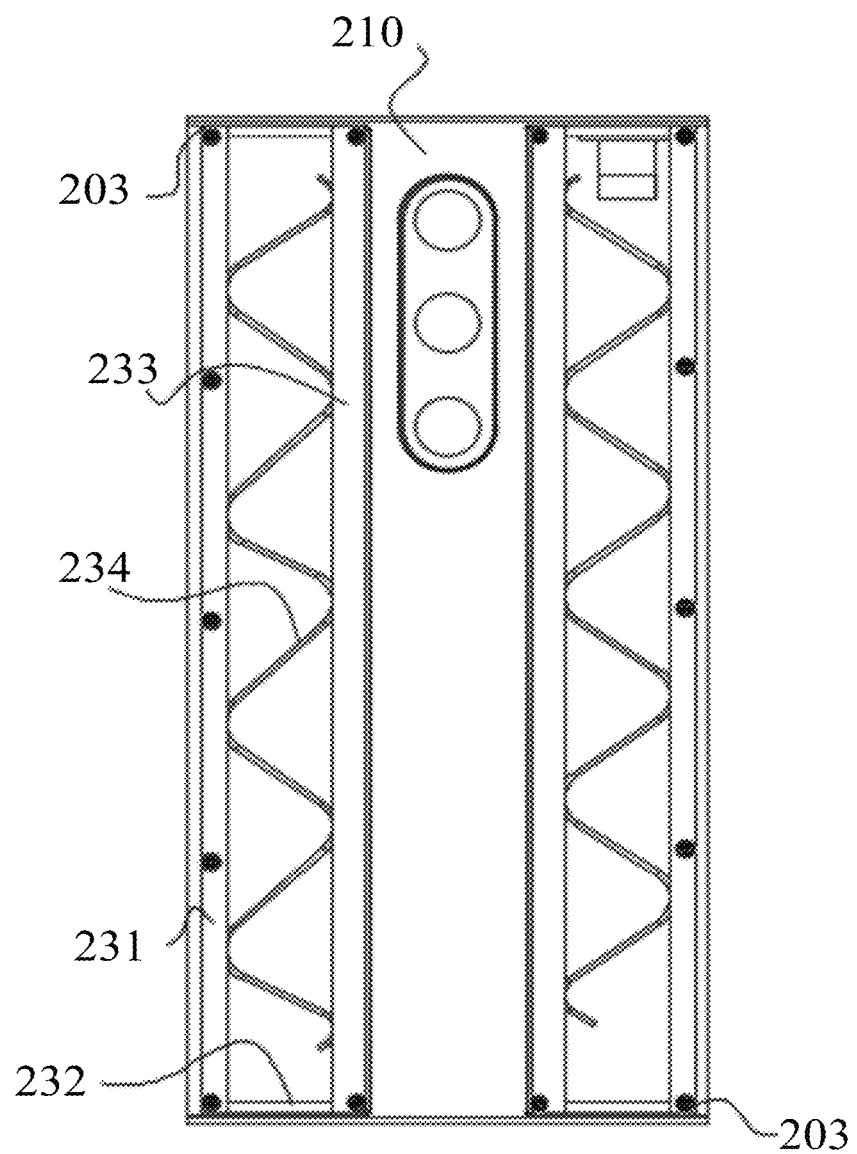
FIG. 19 shows a partial schematic structural diagram in which a flexible screen of an electronic device is in a retracted state according to an exemplary embodiment of the present disclosure.

FIG. 18 shows a partial schematic structural diagram in which a flexible screen 220 of an electronic device is in an extended state according to an exemplary embodiment of the present disclosure, and FIG. 19 shows a partial schematic structural diagram in which a flexible screen 220 of an electronic device is in a retracted state according to an exemplary embodiment of the present disclosure. In some embodiments, with reference to FIGS. 17 to 19, the electronic device further includes at least one elastic telescopic assembly 230 located at the rear surface of the sliding rail assembly 110 and assembled to the housing assembly 210, an end portion of the flexible screen 220 is coupled to the elastic telescopic assembly 230, and the elastic telescopic assembly 230 is stressed by the end portion of the flexible screen 220 to extend and retract. The end portion of the flexible screen 220 is restrained by the elastic telescopic assembly 230, such that the flexible screen 220 is stably extended and retracted, thus improving the user experiences.

Figure 20:
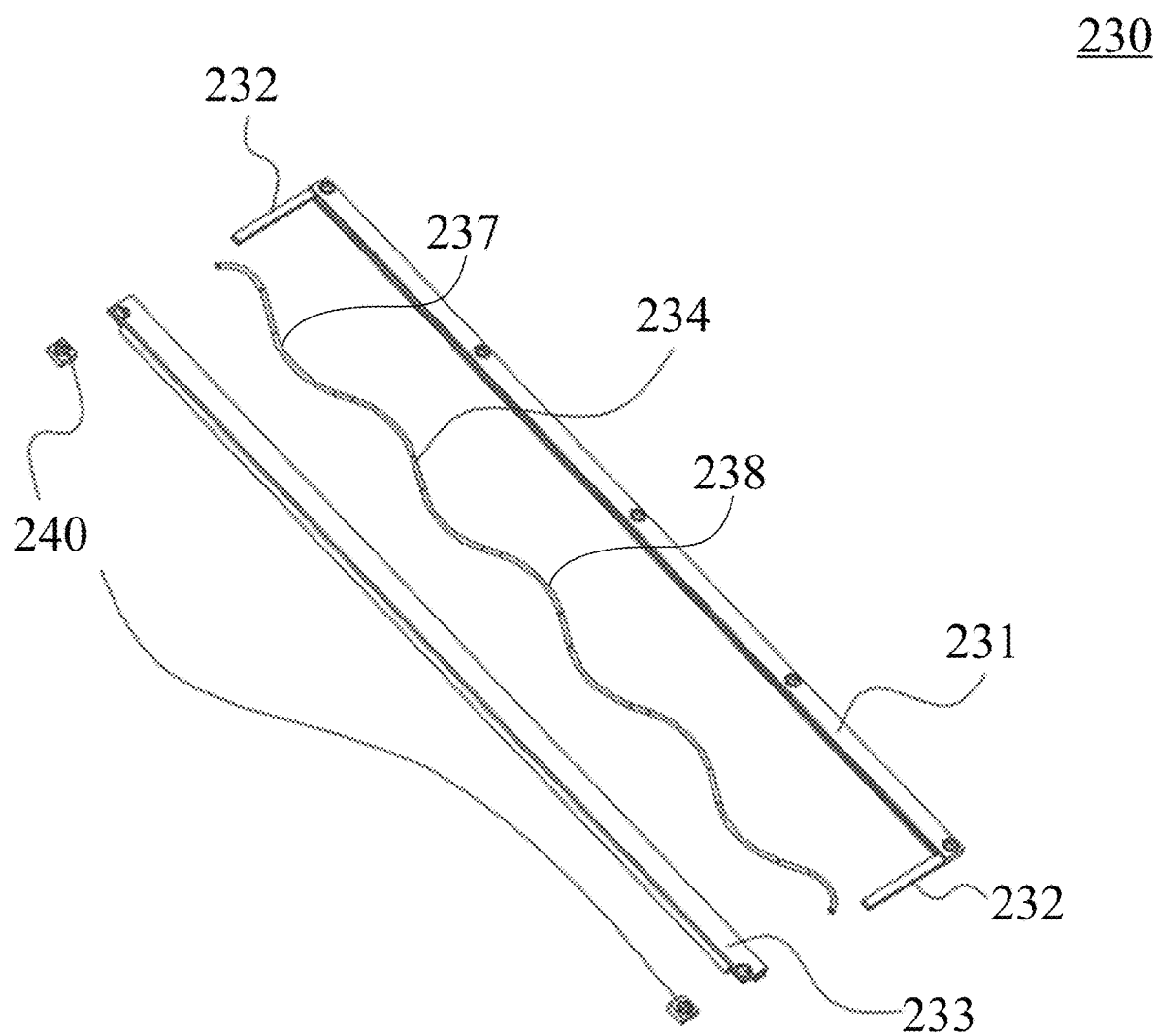
FIG. 20 shows a schematic exploded diagram of an elastic telescopic assembly according to an exemplary embodiment of the present disclosure.
Figure 21:
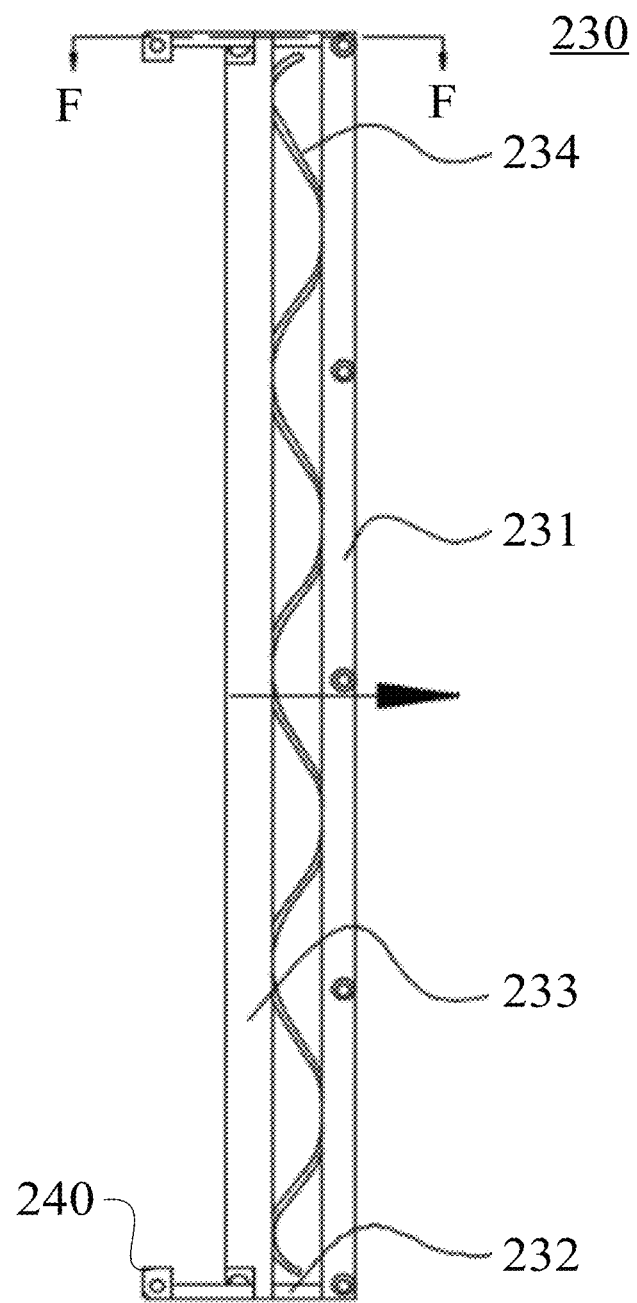
FIG. 21 shows a schematic diagram of an elastic telescopic assembly when a flexible screen in an extended state according to an exemplary embodiment of the present disclosure.
Figure 22:
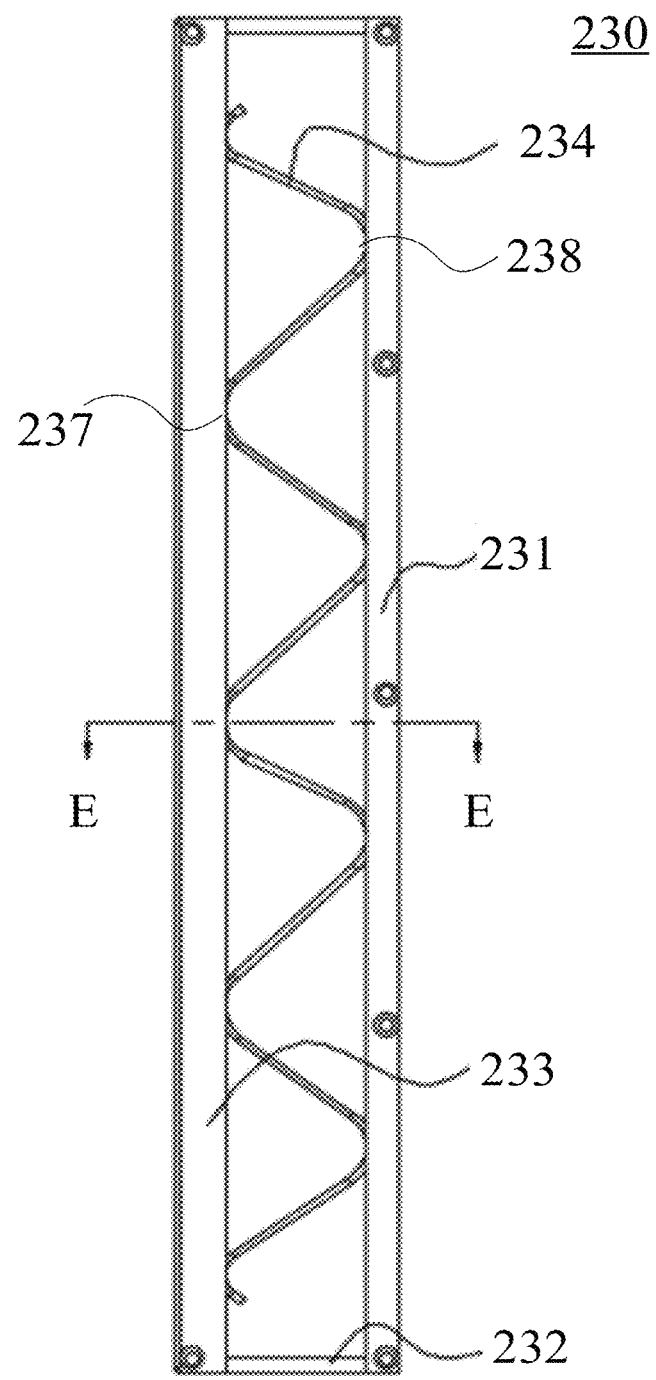
FIG. 22 shows a schematic diagram of an elastic telescopic assembly when a flexible screen in a retracted state according to an exemplary embodiment of the present disclosure.

FIG. 20 shows a schematic exploded diagram of an elastic telescopic assembly 230 according to an exemplary embodiment of the present disclosure, FIG. 21 shows a schematic diagram of an elastic telescopic assembly 230 when a flexible screen 220 in an extended state according to an exemplary embodiment of the present disclosure, and FIG. 22 shows a schematic diagram of an elastic telescopic assembly 230 when a flexible screen 220 in a retracted state according to an exemplary embodiment of the present disclosure. With reference to FIGS. 20 to 22, the elastic telescopic assembly 230 includes a fixed support 231, a guide member 232, a sliding member 233, and a third elastic member 234. The fixed support 231 is fixed to the housing assembly 210 of the electronic device. The fixed support 231 may have a rod-shaped structure, and may be fixed to the housing assembly 210 by a plurality of screws 203, and the plurality of screws 203 may be arranged along an extending direction of the fixed support 231. The guide member 232 is coupled to the fixed support 231. The guide member 232 may also have a rod-shaped structure, and at this point, an extending direction of the guide member 232 may be perpendicular to the extending direction of the rod-shaped fixed support 231. The sliding member 233 is slidably coupled to the guide member 232, and configured to be coupled to an end of the flexible screen 220. The guide member 232 provides guidance for the sliding member 233, and an end of the flexible screen 220 drives the sliding member 233 to slide on the guide member 232. The sliding member 233 may have various structures, for example, a rod-shaped structure, and the rod-shaped sliding member 233 may be perpendicular to the rod-shaped guide member 232, or parallel to the rod-shaped fixed support 231. The third elastic member 234 is provided between the fixed support 231 and the sliding member 233, and configured to restore the sliding member 233. When the flexible screen 220 is extended, an end of the flexible screen 220 drives the sliding member 233 to slide outwards from the housing assembly 210, and the flexible screen 220 is stably extended under a buffer effect of the third elastic member 234. Referring to FIG. 17, 201 is a maximum distance that the sliding member 233 can slide outwards. The third elastic member 234 is compressed between the fixed support 231 and the sliding member 233, and when the flexible screen 220 is retracted, an end of the flexible screen 220 drives the sliding member 233 to restore, and the sliding member 233 is stably restored under restoring and buffer effects of the third elastic member 234, which retracts the flexible screen 220 stably.

Figure 23:
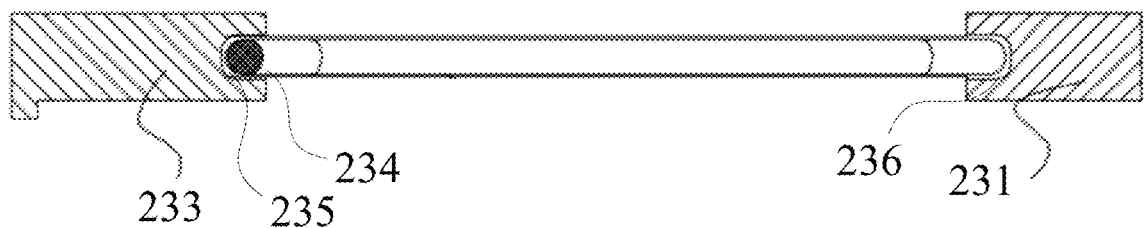
FIG. 23 shows a sectional view of the elastic telescopic assembly in FIG. 22 taken along line E-E.

FIG. 23 shows a sectional view of the elastic telescopic assembly 230 in FIG. 22 taken along line E-E. In some embodiments, referring to FIG. 23, the sliding member 233 is provided with a first limiting groove 235, the fixed support 231 is provided with a second limiting groove 236 opposite to the first limiting groove 235, the third elastic member 234 is limited in the first and second limiting grooves 235, 236, and the third elastic member 234 is extended and retracted along a direction from the first to second limiting grooves 235, 236. Thus, the third elastic member 234 is conveniently assembled between the fixed support 231 and the sliding member 233, and conveniently extended and retracted along the direction from the first to second limiting grooves 235, 236.

In some embodiments, with continued reference to FIG. 22, the third elastic member 234 includes a plurality of first abutting points 237 and a plurality of second abutting points 238, the first abutting points 237 abut against the first limiting groove 235, and the second abutting points 238 abut against the second limiting groove 236, such that the third elastic member 234 is stably extended and retracted between the fixed support 231 and the sliding member 233. In some embodiments, the first and second abutting points 237, 238 are alternately arranged along an extending direction of the first limiting groove 235. Exemplarily, the first abutting point 237 and two adjacent second abutting points 238 form a bent angle structure, and the second abutting point 238 and two adjacent first abutting points 237 form a bent angle structure, such that the third elastic member 234 is in a wavy structure along the extending direction of the first or second limiting groove 235, 236. Thus, the third elastic member 234 may be facilitated to extend and retract stably between the fixed support 231 and the sliding member 233, such that the sliding member 233 stably drives an end of the flexible screen 220 to extend and retract, thus stably extending and retracting the flexible screen 220.

Further, in some embodiments, with continued reference to FIG. 20, the plurality of first abutting points 237 are evenly distributed and the plurality of second abutting points 238 are evenly distributed. Thus, elastic forces formed by the plurality of first abutting points 237 are substantially the same, and elastic forces formed by the plurality of second abutting points 238 are substantially the same, which is further beneficial for the third elastic member 234 to stably extend and retract between the fixed support 231 and the sliding member 233, such that the third elastic member 234 applies a stable acting force to the sliding member 233, and then, the sliding member 233 is stably extended and retracted under the driving of the end portion of the flexible screen 220.

Figure 24:
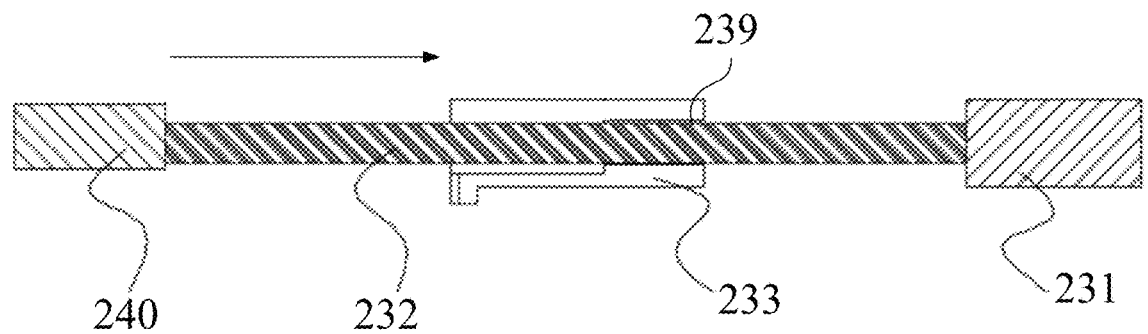
FIG. 24 shows a sectional view of the elastic telescopic assembly in FIG. 21 taken along line F-F.

FIG. 24 shows a sectional view of the elastic telescopic assembly 230 in FIG. 21 taken along line F-F. In some embodiments, referring to FIG. 24, the sliding member 233 is provided with a second sliding groove 239, and the second sliding groove 239 is slidably fitted over the guide member 232, such that the sliding member 233 may be slid under the guide action of the guide member 232. Exemplarily, a cross section of the second sliding groove 239 has a circular arc, square or other structure, and correspondingly, the guide member 232 has a structure matched with the second sliding groove 239.

In some embodiments, with continued reference to FIG. 20, two guide members 232 are oppositely provided at two ends of the fixed support 231, and each of two ends of the sliding member 233 is slidably coupled to one guide member 232, so as to facilitate stable sliding of the sliding member 233 on the guide member 232.

In some embodiments, with continued reference to FIGS. 20, 21, 22 and 24, the elastic telescopic assembly 230 further includes a limiting member 240 fixed to the guide member 232, and the sliding member 233 is slid between the limiting member 240 and the fixed support 231. Thus, the sliding member 233 is prevented from being separated from the guide member 232 when slid on the guide member 232, and the maximum sliding stroke of the sliding member 233 on the guide member 232 is limited by cooperation of the limiting member 240 and the fixed support 231. In FIG. 21, when the flexible screen 220 is extended, the sliding member 233 may be slid from the limiting member 240 towards the fixed support 231 in the arrow direction, and when the flexible screen 220 is retracted, the sliding member 233 may be slid towards the limiting member 240 in a direction opposite to the arrow direction. The limiting member 240 may have a block structure. Exemplarily, the limiting member 240 may be fixed to the guide member 232 by welding.

In some embodiments, the limiting member 240 is further fixed to the housing assembly 210 to be firmly assembled to the housing assembly 210. Exemplarily, the limiting member 240 is provided with a threaded hole, and the threaded hole and the housing assembly 210 are fastened by the screw 203 to firmly fix the limiting member 240 to the housing assembly 210, which also firmly fixes the elastic telescopic assembly 230 to the housing assembly 210.

Figure 25:
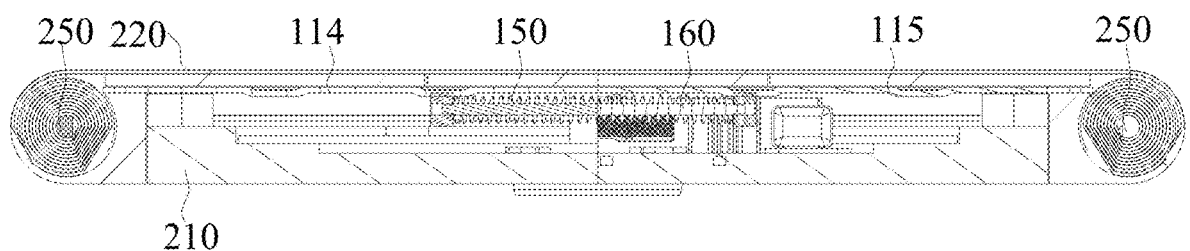
FIG. 25 shows a partial sectional view of an electronic device according to an exemplary embodiment of the present disclosure.

FIG. 25 shows a partial sectional view of an electronic device according to an exemplary embodiment of the present disclosure. In some embodiments, referring to FIG. 25, the electronic device further includes a reel assembly 250 fixed to an edge of the sliding rail 112 slidable outwards from the housing assembly 210, part of the flexible screen 220 is extendably and retractably wound around the reel assembly 250 by the end portion, the sliding rail 112 is slid outwards from the housing assembly 210 to extend part of the flexible screen 220 from the reel assembly 250, so as to extend the flexible screen 220, and the sliding rail 112 is slid towards the housing assembly 210 from an outside to retract part of the flexible screen 220 into the reel assembly 250, so as to retract the flexible screen 220.

Figure 26:
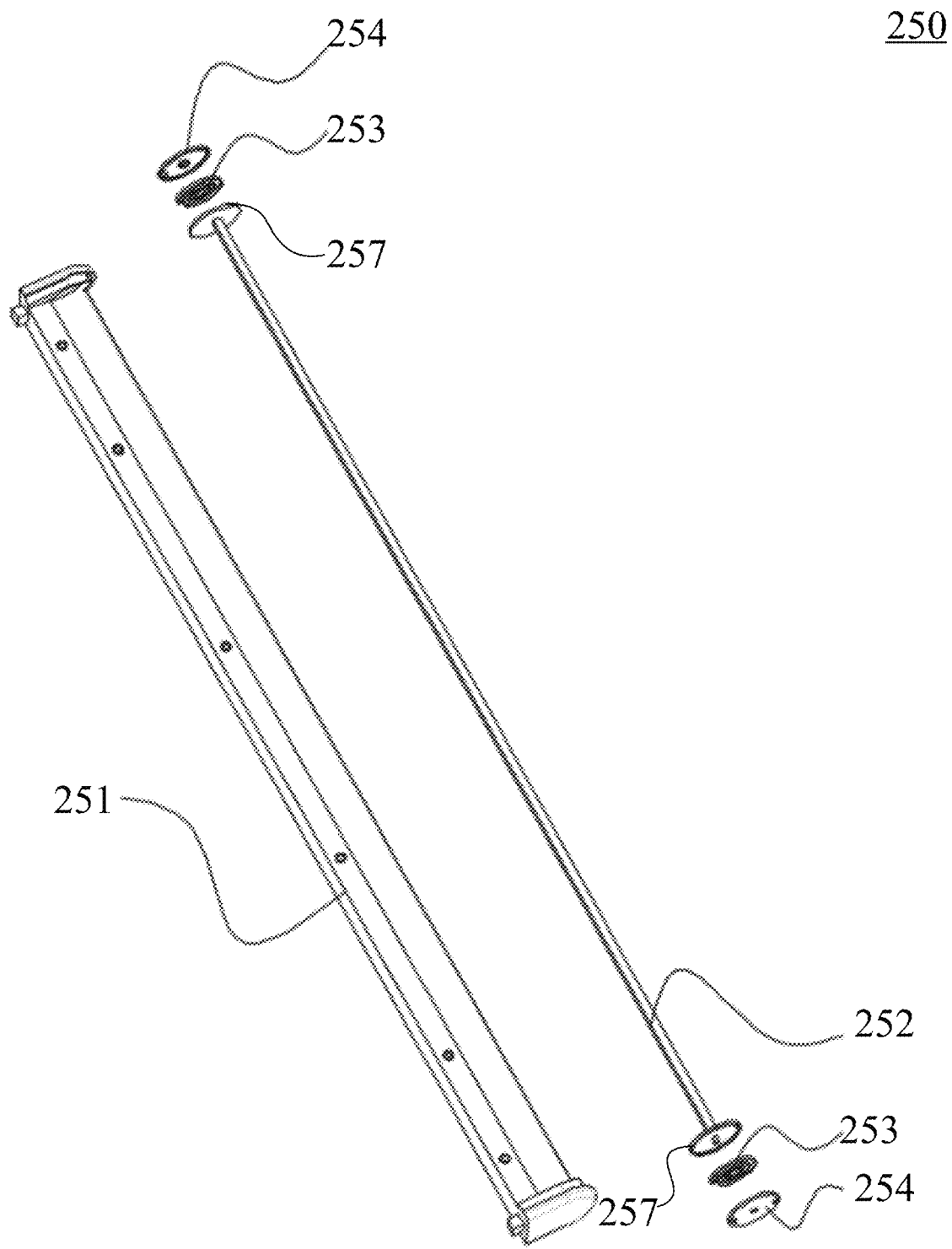
FIG. 26 shows a schematic exploded diagram of a reel assembly according to an exemplary embodiment of the present disclosure.
Figure 27:
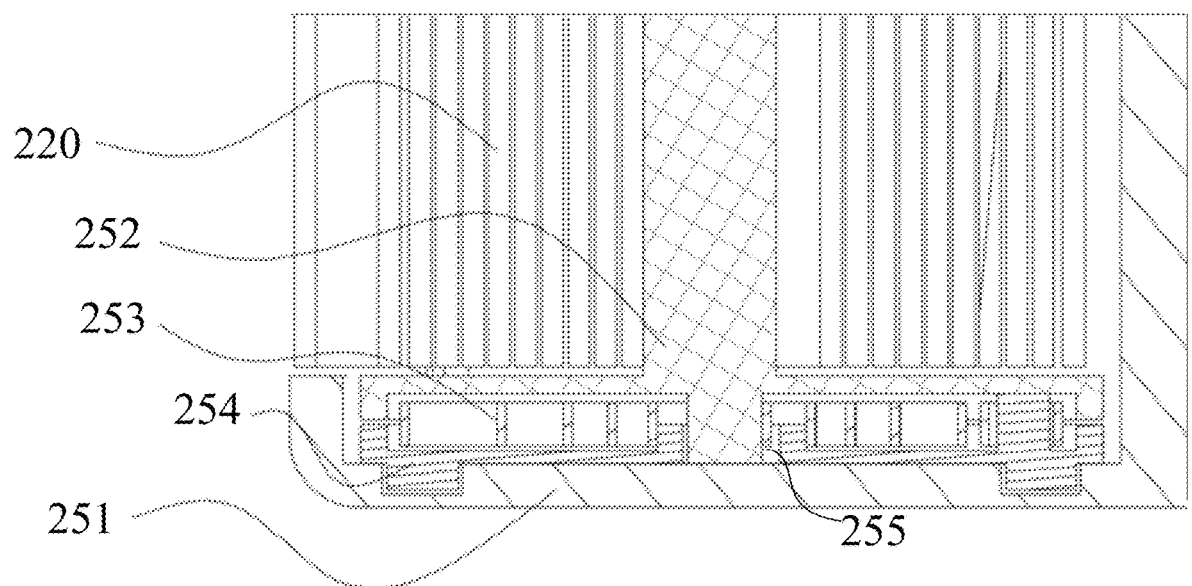
FIG. 27 shows a partial sectional view of a reel assembly according to an exemplary embodiment of the present disclosure.
Figure 28:
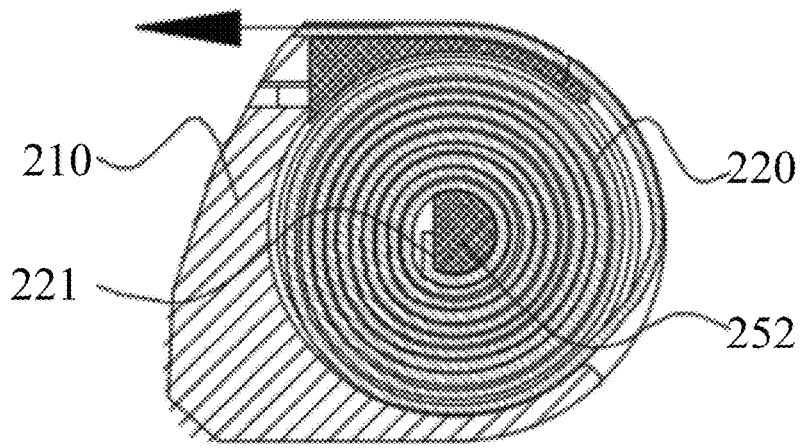
FIG. 28 shows a side view of a reel assembly according to an exemplary embodiment of the present disclosure.
Figure 29:
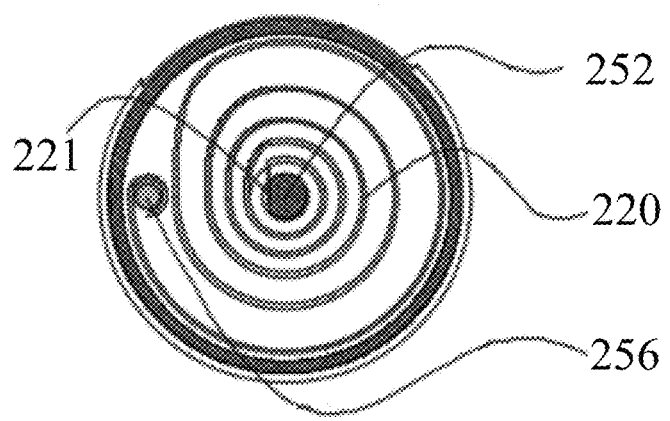
FIG. 29 shows a side view of a reel assembly according to an exemplary embodiment of the present disclosure.

FIG. 26 shows a schematic exploded diagram of a reel assembly 250 according to an exemplary embodiment of the present disclosure, FIG. 27 shows a partial sectional view of a reel assembly 250 according to an exemplary embodiment of the present disclosure, FIG. 28 shows a side view of a reel assembly 250 according to an exemplary embodiment of the present disclosure, and FIG. 29 shows a side view of a reel assembly 250 according to an exemplary embodiment of the present disclosure. In some embodiments, with reference to FIGS. 26 to 29, the reel assembly 250 includes a reel support 251, a rotating shaft 252, and a fourth elastic member 253. The reel support 251 is fixed to the edge of the sliding rail 112, the rotating shaft 252 is rotatably assembled to the reel support 251, the fourth elastic member 253 is coupled to the rotating shaft 252, and configured to restore the rotating shaft 252. Part of the flexible screen 220 is wound around the rotating shaft 252 by the end portion, and the end portion of the flexible screen 220 may be referred to as a winding end 221. When the sliding rail 112 is slid outwards from the housing assembly 210, due to fixation of part of the flexible screen 220 to the housing assembly 210, part of the flexible screen 220 wound around the rotating shaft 252 is released under the driving action of extension of the sliding rail 112, such that the flexible screen 220 is in the extended state, referring to FIG. 29. When the sliding rail 112 is slid from the outside to the housing assembly 210, the rotating shaft 252 is rotated under the restoring action of the fourth elastic member 253, such that part of the flexible screen 220 is wound around the rotating shaft 252, and the flexible screen 220 is in the retracted state, referring to FIG. 28. Exemplarily, the reel support 251 may be fixed to the edge of the sliding rail 112 by the screw 203.

In some embodiments, with continued reference to FIGS. 26 and 27, the reel assembly 250 further includes a fixed end cap 254 fixed to the reel support 251, the fixed end cap 254 is provided with a shaft hole 255, and an end of the rotating shaft 252 is rotatably limited in the shaft hole 255. Thus, the rotating shaft 252 is rotatably assembled to the reel support 251.

In some embodiments, with continued reference to FIGS. 26 and 27, the fourth elastic member 253 includes a volute spiral spring having a first end coupled to the rotating shaft 252 and a second end coupled to the fixed end cap 254. The volute spiral spring is easy to obtain, and facilitates rotation and restoration of the rotating shaft 252. In at least one embodiment, when the sliding rail 112 is slid outwards from the housing assembly 210, the rotating shaft 252 is driven to rotate to release the flexible screen 220 outwards, and meanwhile, the rotating shaft 252 drives the volute spiral spring to rotate, such that the volute spiral spring generates an elastic force. When the sliding rail 112 is slid from the outside to the housing assembly 210, a direction of the elastic force generated by the volute spiral spring is opposite to the rotation direction of the rotating shaft 252, which causes the volute spiral spring to drive the rotating shaft 252 to rotate reversely, such that part of the flexible screen 220 is retracted to be wound around the rotating shaft 252.

In some embodiments, with continued reference to FIG. 29, a limiting pillar 256 is provided on a surface of the fixed end cap 254 facing the volute spiral spring, and a second end of the volute spiral spring is coupled to the limiting pillar 256. The arrangement of the limiting pillar 256 facilitates coupling between the second end of the volute spiral spring and the fixed end cap 254. Exemplarily, the second end of the volute spiral spring may be fixed to the limiting pillar 256 by winding or welding.

In some embodiments, with continued reference to FIGS. 26 and 27, a rotating shaft disk 257 is fitted over the rotating shaft 252, and the volute spiral spring is located between the rotating shaft disk 257 and the fixed end cap 254. Thus, the volute spiral spring is stably limited between the rotating shaft disk 257 and the fixed end cap 254, which is beneficial for the volute spiral spring to rotate along with the rotating shaft 252 and to drive the rotating shaft 252 to rotate for restoration.

Figure 30:
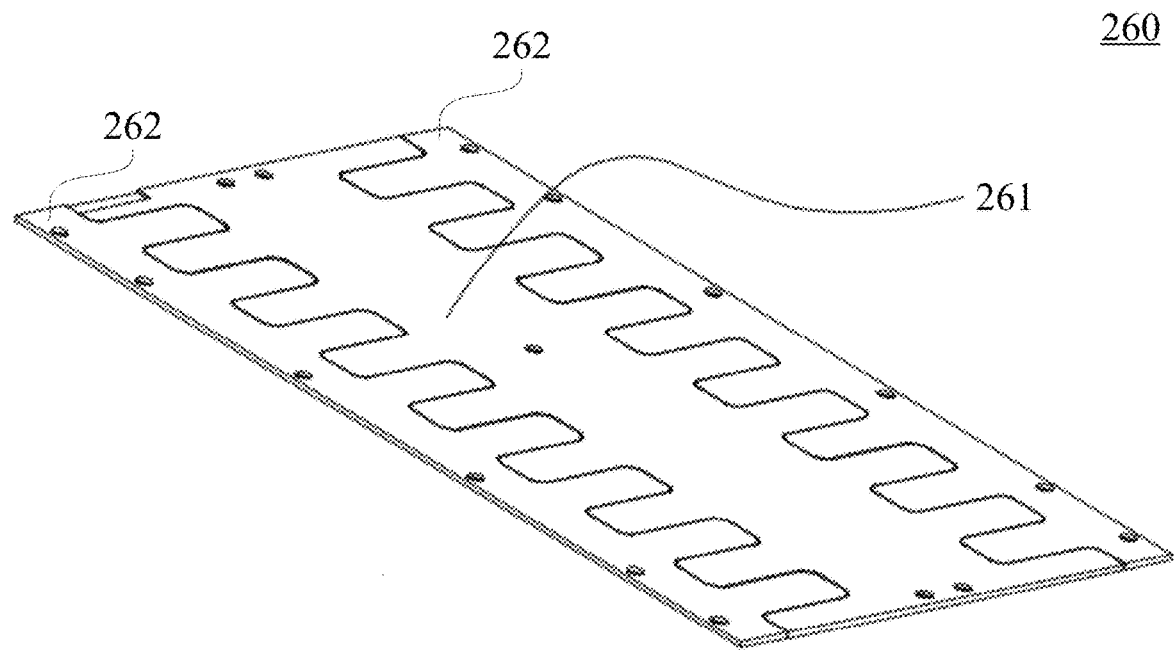
FIG. 30 shows a schematic diagram of retraction of a supporting plate assembly according to an exemplary embodiment of the present disclosure.
Figure 31:
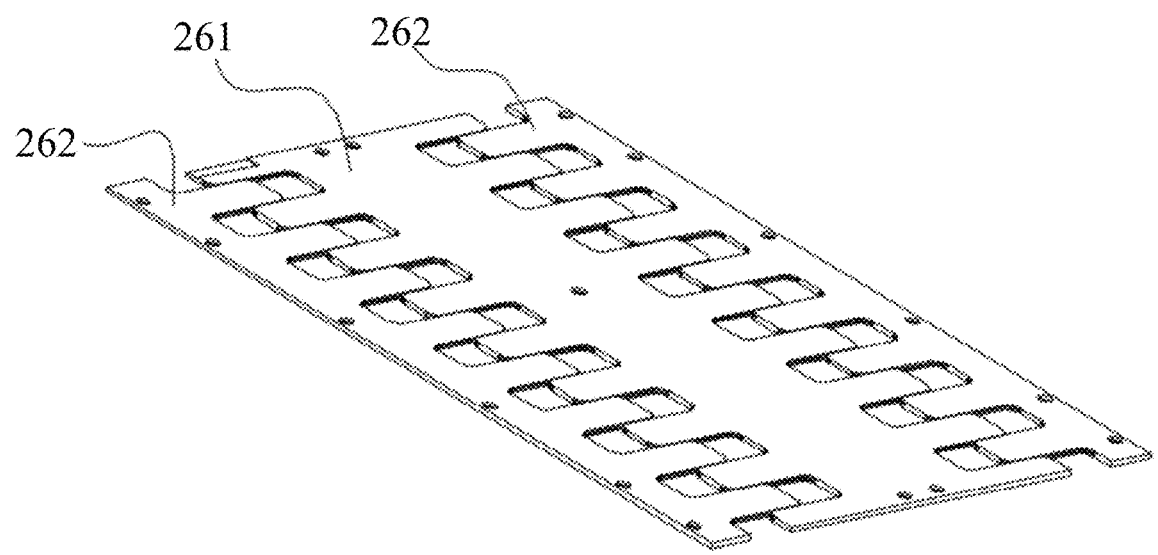
FIG. 31 shows a schematic diagram of extension of a supporting plate assembly according to an exemplary embodiment of the present disclosure.

FIG. 30 shows a schematic diagram of retraction of a supporting plate assembly 260 according to an exemplary embodiment of the present disclosure, and FIG. 31 shows a schematic diagram of extension of a supporting plate assembly 260 according to an exemplary embodiment of the present disclosure. In some embodiments, with reference to FIGS. 30 and 31, the electronic device further includes the supporting plate assembly 260 provided between the sliding rail assembly 110 and the flexible screen 220. The supporting plate assembly 260 includes a fixed supporting plate 261 and at least one movable supporting plate 262, the fixed supporting plate 261 is fixed to the housing assembly 210, the movable supporting plate 262 is slidably coupled to the fixed supporting plate 261, and further coupled to the sliding rail 112, and part of the flexible screen 220 is fixed to the fixed supporting plate 261. It should be noted that the number of the movable supporting plates 262 may be equal to the number of the sliding rails 112, and the movable supporting plates 262 are coupled to the sliding rails 112 in one-to-one correspondence. Exemplarily, the movable supporting plate 262 includes a first movable supporting plate and a second movable supporting plate which are arranged oppositely, the first movable supporting plate is coupled to the first sliding rail 114, and the second movable supporting plate is coupled to the second sliding rail 115. The supporting plate assembly 260 is configured to support the flexible screen 220 to ensure that the flexible screen 220 does not collapse in both the extended and retracted states. Part of the flexible screen 220 may be glued to the fixed supporting plate 261.

Figure 32:
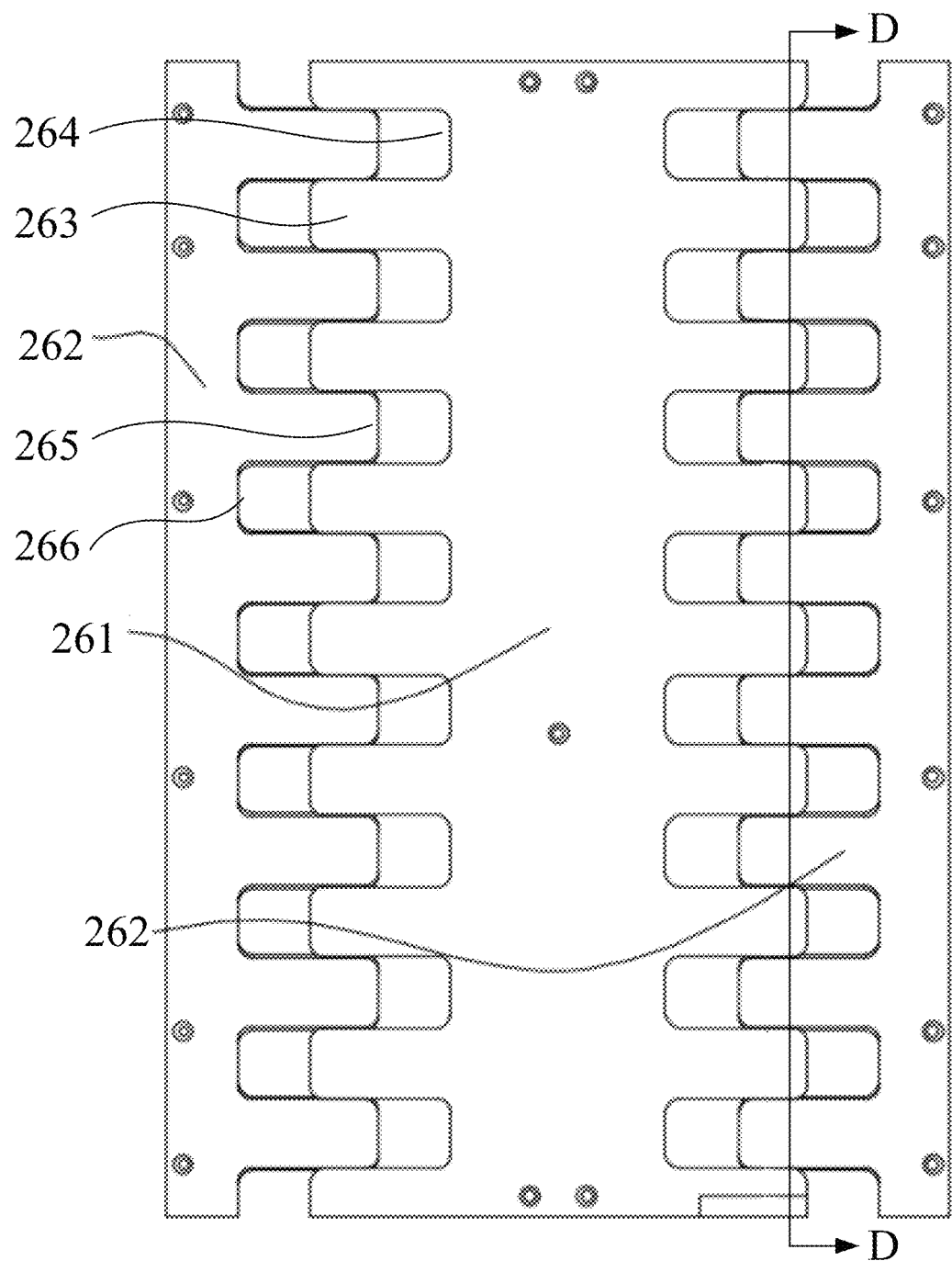
FIG. 32 shows a schematic diagram of extension of a supporting plate assembly according to an exemplary embodiment of the present disclosure.

FIG. 32 shows a schematic diagram of extension of a supporting plate assembly 260 according to an exemplary embodiment of the present disclosure. In some embodiments, referring to FIG. 32, an edge of the fixed supporting plate 261 is provided with a plurality of first protrusions 263 and a plurality of first recesses 264; and an edge of the movable supporting plate 262 is provided with a plurality of second protrusions 265 and a plurality of second recesses 266. The second protrusions 265 are slidably coupled to the first recesses 264, and the second recesses 266 are slidably coupled to the first protrusions 263. Thus, the first protrusions 263 are fitted with the second recesses 266, and the first recesses 264 are fitted with the second protrusions 265, such that surfaces of the movable and fixed supporting plates 262, 261 are flush after the supporting plate assembly 260 is extended, thus achieving a flat supporting effect on the flexible screen 220. Exemplarily, the plurality of first protrusions 263 and the plurality of first recesses 264 are arranged alternately, and the plurality of second protrusions 265 and the plurality of second recesses 266 are arranged alternately.

Figure 33:
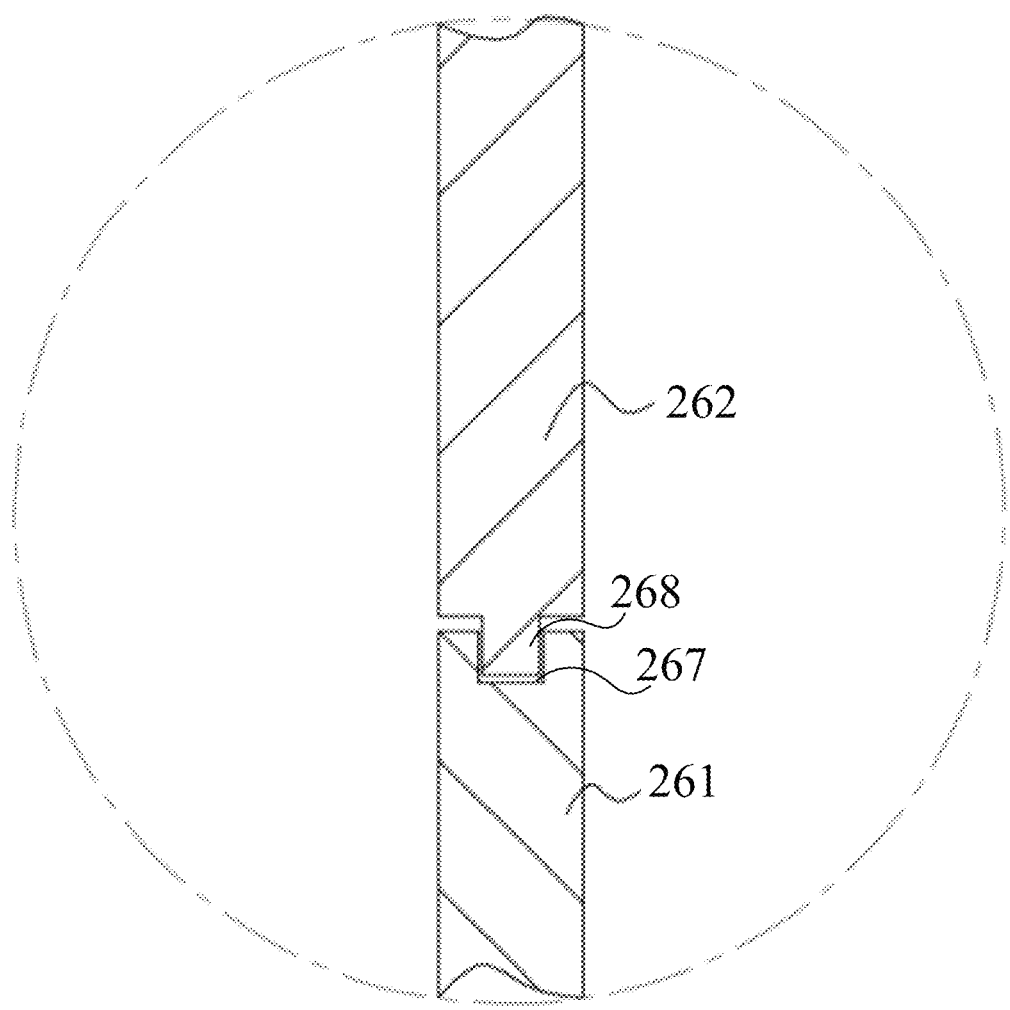
FIG. 33 is a partial enlarged view of the supporting plate assembly in FIG. 32 taken along line D-D.

In some embodiments, one of an edge of the first protrusion 263 and an edge of the second recess 266 is provided with a third sliding groove, and the other is provided with a first sliding portion fitted with the third sliding groove; and one of an edge of the second protrusion 265 and an edge of the first recess 264 is provided with a fourth sliding groove, and the other is provided with a second sliding portion fitted with the fourth sliding groove, thus facilitating surface flatness of the supporting plate assembly 260. Exemplarily, a cross section of the third sliding groove may have a T-groove structure, and the first sliding portion may have a structure matched with the third sliding groove. Exemplarily, a cross section of the fourth sliding groove may have a T-groove structure, and the second sliding portion may have a structure matched with the fourth sliding groove. FIG. 33 is a partial enlarged view of the supporting plate assembly 260 in FIG. 32 taken along line D-D. With continued reference to FIG. 33, the fixed supporting plate 261 may be provided with a third sliding groove 267 or a fourth sliding groove, and the movable supporting plate 262 may be provided with a first sliding portion 268 matched with the third sliding groove 267 or a second sliding portion matched with the fourth sliding groove.

In some embodiments, with continued reference to FIG. 8, an edge of the housing assembly 210 is provided with a limiting portion 211, and the sliding rail 112 is provided with a third limiting groove 118, and slid outwards from the housing assembly 210 to limit the limiting portion 211 in the third limiting groove 118. Thus, the maximum stroke of the sliding rail 112 slidable outwards from the housing assembly 210 is limited by the cooperation of the limiting portion 211 and the third limiting groove 118, and the sliding rail 112 is prevented from being separated from the housing assembly 210. The limiting portion 211 may have a protruding structure, or the limiting portion 211 is configured as a screw fixed to the housing component 210.

In some embodiments, the electronic device further includes a controller 300 coupled to the driving assembly of the sliding mechanism and configured to control the driving assembly to drive the sliding rail to slide. Exemplarily, the controller 300 may include a CPU (Central Processing Unit) of the electronic device. Exemplarily, the driving member is coupled to a flexible circuit board, and the flexible circuit board is provided with a driving chip, and coupled to a controller 300 of the electronic device through an elastic piece or a BTB (board-to-board) connector, such that the controller 300 may control the driving member to work. In response to a tapping operation, the flexible screen sends a first instruction to the controller 300, the controller 300 sends a first driving instruction to the driving chip of the driving member according to the first instruction, and the driving chip controls the driving member to drive the first transmission lead screw 122 to rotate around a first direction based on the first driving instruction, such that the first and second sliding rails 114, 115 are extended oppositely. In response to a tapping operation, the flexible screen sends a second instruction to the controller 300, the controller 300 sends a second driving instruction to the driving chip of the driving member according to the second instruction, and the driving chip controls the driving member to drive the first transmission lead screw 122 to rotate around a second direction different from the first direction based on the second driving instruction, such that the first and second sliding rails 114, 115 are retracted oppositely.

In conclusion, in the sliding mechanism 100 and the electronic device according to the embodiments of the present disclosure, part of the flexible screen 220 is provided at the front surface of the sliding rail 112 and fixed to the housing assembly 210, at least an end portion of the flexible screen 220 is provided at the edge or the rear surface of the sliding rail 112, and the flexible screen 220 is extended when the sliding rail 112 is slid outwards from the housing assembly 210, so as to increase the display area of the flexible screen 220. The flexible screen 220 is retracted when the sliding rail 112 is slid towards the housing assembly 210 from the outside, so as to reduce the display area of the flexible screen 220. The sliding rail 112 may be driven to slide to any position in the maximum stroke of the sliding rail 112 by the driving assembly 120, such that the flexible screen 220 of the electronic device may perform display in different sizes, thus improving the user experiences. Compared with the foldable screen, the mass is reduced, and the electronic device is convenient for the user to carry, and improves the market competitiveness. The flexible screen 220 is supported by the supporting plate assembly 260 to avoid collapse of the flexible screen 220. Since the elastic telescopic assembly 230 is coupled to the end portion of the flexible screen 220, the flexible screen 220 may be stably extended and retracted by extension and retraction of the elastic telescopic assembly 230. Or, since the end portion of the flexible screen 220 is wound around the reel assembly 250, the flexible screen 220 is released or retracted by the reel assembly 250, such that the flexible screen 220 may be stably extended and retracted.

The above embodiments of the present disclosure may complement each other without conflict.

The above descriptions are merely embodiments of the disclosure and are not intended to restrict the disclosure. Any modification, equivalent replacement, or improvement made within the spirit and principle of the present disclosure shall be included in the protection scope of the present disclosure.

What is claimed is:

1. A sliding mechanism for an electronic device, comprising: a sliding rail assembly comprising at least one fixing member and at least one sliding rail, the fixing member being fixed to a housing assembly of the electronic device and provided with a first sliding groove, and the sliding rail having an end slidably limited in the first sliding groove; and a driving assembly fixed to the housing assembly, coupled to the sliding rail, and configured to drive the at least one sliding rail to slide outwards from a retracted state to an extended state from the housing assembly and to slide inward towards the retracted state of the housing assembly from the extended state, wherein the sliding rail comprises a first sliding rail and a second sliding rail, and the driving assembly is coupled to the first and second sliding rails, and configured to drive the first and second sliding rails to move in opposite directions to slide towards and away from each other, wherein two fixing members are provided and arranged oppositely, and the first and second sliding rails are limited between the first sliding grooves of the two fixing members.

2. The sliding mechanism according to claim 1, wherein the driving assembly comprises a driving assembly support fixed to the housing assembly, a first transmission lead screw, a second transmission lead screw, a first guide rod, a driving member and a pushing member, the first transmission lead screw and the first guide rod are assembled to the driving assembly support, the second transmission lead screw is axially movably assembled to the driving assembly support, and the driving member is configured to drive the first transmission lead screw to rotate; and the pushing member is provided with a sliding hole, a first transmission hole and a second transmission hole, the sliding hole is slidably fitted over the first guide rod, the first transmission hole is drivingly coupled to the first transmission lead screw, the second transmission hole is drivingly coupled to the second transmission lead screw, the second transmission lead screw and the pushing member have opposite moving directions, the pushing member is configured to drive the first sliding rail to slide, and the second transmission lead screw is configured to drive the second sliding rail to slide.

3. The sliding mechanism according to claim 2, wherein an inner wall of the first transmission hole is provided with a transmission thread fitted with the first transmission lead screw to enable the pushing member to be linearly moved under driving action of the first transmission lead screw; an inner wall of the second transmission hole is provided with a transmission thread fitted with the second transmission lead screw, such that when the pushing member is moved linearly, the second transmission lead screw is linearly moved opposite to the pushing member.

4. The sliding mechanism according to claim 2, wherein the driving assembly further comprises an adapter, an end of the second transmission lead screw is rotatably coupled to the adapter, and the adapter is configured to drive the second sliding rail to slide.

5. The sliding mechanism according to claim 4, wherein the driving assembly further comprises a first elastic buffer assembly and a second elastic buffer assembly, the first elastic buffer assembly is fixed to the first sliding rail, the second elastic buffer assembly is fixed to the second sliding rail, the first elastic buffer assembly is coupled to the pushing member, and the second elastic buffer assembly is coupled to the adapter.

6. The sliding mechanism according to claim 5, wherein the first elastic buffer assembly comprises a first fixed portion, a second fixed portion, a second guide rod and a first elastic member; and
the first and second fixed portions are fixed to the first sliding rail, the second guide rod is fixed between the first and second fixed portions, the first elastic member is fitted over the second guide rod, and the pushing member pushes the first elastic member to extend and retract on the second guide rod.

7. The sliding mechanism according to claim 6, wherein the first elastic buffer assembly further comprises a first guide sleeve slidably fitted over the second guide rod and coupled to an end of the first elastic member, and the pushing member is coupled to the first guide sleeve.

8. The sliding mechanism according to claim 5, wherein the second elastic buffer assembly comprises a third fixed portion, a fourth fixed portion, a third guide rod and a second elastic member; and
the third and fourth fixed portions are fixed to the second sliding rail, the third guide rod is fixed between the third and fourth fixed portions, the second elastic member is fitted over the third guide rod, and the adapter pushes the second elastic member to extend and retract on the second guide rod.

9. The sliding mechanism according to claim 8, wherein the second elastic buffer assembly further comprises a second guide sleeve slidably fitted over the third guide rod and coupled to an end of the second elastic member, and the adapter is coupled to the second guide sleeve.

10. The sliding mechanism according to claim 2, wherein the driving assembly further comprises a reduction gearbox having a first end coupled to the first transmission lead screw and a second end coupled to the driving member.

11. The sliding mechanism according to claim 1, wherein the sliding rail assembly further comprises a buffer limiting member provided to the fixing member and configured to abut against the sliding rail sliding towards the housing assembly from the outside.

12. The sliding mechanism according to claim 1, wherein the first sliding groove comprises a first lubrication layer forming an inner wall of the first sliding groove.

13. An electronic device, comprising:
a housing assembly;
a sliding mechanism comprising:
    a sliding rail assembly comprising at least one fixing member and at least one sliding rail, the fixing member being fixed to the housing assembly and provided with a first sliding groove, and the sliding rail having an end slidably limited in the first sliding groove; and
    a driving assembly fixed to the housing assembly, coupled to the sliding rail, and configured to drive the at least one sliding rail to slide outwards from a retracted state to an extended state from the housing assembly and to slide inwards towards the retracted state of the housing assembly from the extended state; the sliding mechanism being assembled to the housing assembly, the sliding rail of the sliding mechanism comprising a front surface and a rear surface opposite to the front surface; and
a flexible screen, a first part of the flexible screen being provided at the front surface of the sliding rail and fixed to the housing assembly, at least an end portion of the flexible screen being provided at an edge or the rear surface of the sliding rail, and the sliding rail being slidable outwards from the housing assembly to extend the flexible screen and slidable towards the housing assembly from the extended state to retract the flexible screen,
wherein the sliding rail comprises a first sliding rail and a second sliding rail, and the driving assembly is coupled to the first and second sliding rails, and configured to drive the first and second sliding rails to move in opposite directions to slide towards and away from each other.

14. The electronic device according to claim 13, wherein the electronic device further comprises a controller coupled to the driving assembly of the sliding mechanism and configured to control the driving assembly to drive the sliding rail to slide.

15. The electronic device according to claim 13, wherein a limiting portion is provided at an edge of the housing assembly, and the sliding rail is provided with a third limiting groove, and slid outwards from the housing assembly, such that the limiting portion is limited in the third limiting groove.

16. The electronic device according to claim 13, wherein the electronic device further comprises at least one elastic telescopic assembly located at the rear surface of the sliding rail assembly and assembled to the housing assembly, the end portion of the flexible screen is coupled to the elastic telescopic assembly, and the elastic telescopic assembly is stressed by the end portion of the flexible screen to extend and retract.

17. The electronic device according to claim 13, wherein the electronic device further comprises a reel assembly fixed to an edge of the sliding rail slidable outwards from the housing assembly, a second part of the flexible screen is extendably and retractably wound around the reel assembly by the end portion, and the sliding rail is slidable outwards from the housing assembly to extend the second part of the flexible screen out from the reel assembly, and slidable towards the housing assembly from the extended state to retract the second part of the flexible screen to the reel assembly.

18. The electronic device according to claim 13, wherein the electronic device further comprises a supporting plate assembly provided between the sliding rail assembly and the flexible screen; and the supporting plate assembly comprises a fixed supporting plate and at least one movable supporting plate, the fixed supporting plate is fixed to the housing assembly, the movable supporting plate is slidably coupled to the fixed supporting plate, and further coupled to the sliding rail, and the first part of the flexible screen is fixed to the fixed supporting plate.

* * * * *